US011961637B1

(12) United States Patent
Chen et al.

(10) Patent No.: US 11,961,637 B1
(45) Date of Patent: Apr. 16, 2024

(54) STRETCHABLE COMPOSITE ELECTRODE AND FABRICATING METHOD THEREOF

(71) Applicant: TPK Advanced Solutions Inc., Fujian (CN)

(72) Inventors: Wei Sheng Chen, Zhangpu County (CN); Ching Mao Huang, New Taipei (TW); Jia Hui Zhou, Ganzhou (CN); Huan Ran Yu, Youxi County (CN); Shu Xiong Wang, Pucheng County (CN); Chin Hui Lee, New Taipei (TW)

(73) Assignee: TPK ADVANCED SOLUTIONS INC., Fujian (CN)

( * ) Notice: Subject to any disclaimer, the term of this patent is extended or adjusted under 35 U.S.C. 154(b) by 0 days.

(21) Appl. No.: 18/076,458

(22) Filed: Dec. 7, 2022

(51) Int. Cl.
*H01B 5/14* (2006.01)
*H01B 1/02* (2006.01)

(52) U.S. Cl.
CPC ................ *H01B 5/14* (2013.01); *H01B 1/02* (2013.01)

(58) Field of Classification Search
CPC ........................................ H01B 5/14
USPC ........................................ 428/209
See application file for complete search history.

(56) References Cited

U.S. PATENT DOCUMENTS

2017/0016875 A1* 1/2017 Parker ................ G01N 33/4833
2017/0172439 A1* 6/2017 Zhu ......................... B32B 15/14
2020/0149987 A1* 5/2020 Ahamed ............. B29C 37/0053

FOREIGN PATENT DOCUMENTS

CN 107655598 B 1/2020
CN 112428699 B 4/2022
TW 201803414 A 1/2018
TW 202206270 A 2/2022
WO 2007022226 A2 2/2007

* cited by examiner

*Primary Examiner* — Betelhem Shewareged
(74) *Attorney, Agent, or Firm* — Cooper Legal Group, LLC

(57) ABSTRACT

This disclosure relates to a stretchable composite electrode and a fabricating method thereof, and particularly relates to a stretchable composite electrode including a silver nanowire layer and a flexible polymer film and a fabricating method thereof.

5 Claims, 25 Drawing Sheets

S20

S10

S20

S30

S40

S50

S60

STRETCHABLE COMPOSITE ELECTRODE AND FABRICATING METHOD THEREOF

BACKGROUND

Field of Disclosure

The present disclosure relates to a stretchable composite electrode and a manufacturing method of a stretchable composite electrode.

Description of Related Art

With the development of science and technology, many electronic devices on the market are gradually evolving towards a thin, short, and wearable form. However, a sensing electrode in a wearable electronic device is often unable to withstand the large stretching deformation caused by limb movements of a user and is prone to local cracks or whole fracture during use, which limits its application as a stretchable electrode.

Silver nanowires have the potential to replace existing materials as electrode materials in wearable electronic devices due to their high electrical conductivity, high ductility, and excellent optical properties. A conventional technique is to coat a solution containing silver nanowires on a soft substrate. However, due to poor adhesion of silver nanowires and when the selected soft substrate is a material with low surface tension, the silver nanowire solution often condenses into water droplets on the surface of the substrate, thus the silver nanowire layer cannot be stably formed. It is mentioned in China patent of publication patent number CN107655598B that by using a solvent to treat the surface of a polydimethylsiloxane (PDMS) substrate, the adhesion between the PDMS substrate and the silver nanowire is increased. However, the experiment of the present disclosure proves that a surface treatment by plasma has a better improvement than a surface treatment by solvent. On the other hand, it is mentioned in China patent of publication patent number CN112428699B that by using plasma to treat the surface of the PDMS substrate, the adhesion between the PDMS substrate and the silver nanowire is increased. However, China patent of publication patent number CN112428699B only discloses the formation of the silver nanowire layer on the surface of the PDMS substrate and does not disclose the technical features of the silver nanowire layer partially embedded in the PDMS film of the present disclosure. Although these methods can improve the hydrophobicity of the PDMS material and form the silver nanowire layer on the PDMS substrate, it is difficult to prevent the silver nanowire layer from being broken or peeled off when stretched by external force.

Based on the above, how to provide a stretchable electrode that can be well and stably applied to wearable electronic devices is an important issue for those skilled in the art.

SUMMARY

According to some embodiments of the present disclosure, a stretchable composite electrode includes a film and a silver nanowire layer. The film has a surface that is substantially flat, and the film is a polymer film with a Young's modulus between 1.25 MPa and 3 MPa. The silver nanowire layer is partially embedded in the surface of the film. When a stretching length variation of the stretchable composite electrode is 47%, a resistance recovery of the stretchable composite electrode is between 94% and 98%.

In some embodiments of the present disclosure, the polymer film is polydimethylsiloxane.

In some embodiments of the present disclosure, when the stretching length variation of the stretchable composite electrode is 18%, the resistance recovery of the stretchable composite electrode is between 97% and 98%.

In some embodiments of the present disclosure, a thickness of a portion of the silver nanowire layer that is embedded in the film is 0.027% to 0.048% of a thickness of the film.

In some embodiments of the present disclosure, the silver nanowire layer includes a plurality of silver nanowires, and at least a portion of the silver nanowires are embedded in the surface of the film.

In some embodiments of the present disclosure, a thickness of the film is between 200 μm and 400 μm.

According to some other embodiments of the present disclosure, a manufacturing method of a stretchable composite electrode includes: forming a silver nanowire layer on a carrier, in which the silver nanowire layer has a first surface in contact with the carrier and a second surface facing away from the first surface; forming a coating on the second surface of the silver nanowire layer, and allowing a portion of the coating to penetrate into the silver nanowire layer; curing the coating to form a film, in which the coating that penetrates into the silver nanowire layer forms a surface of the film that is substantially flat, and a portion of the silver nanowire layer is embedded in the surface of the film; and removing the carrier, thereby exposing the first surface of the silver nanowire layer.

In some embodiments of the present disclosure, the manufacturing method of the stretchable composite further includes: performing a surface plasma treatment on the silver nanowire layer and the film from the first surface of the silver nanowire layer.

In some embodiments of the present disclosure, forming the silver nanowire layer on the carrier includes: coating a silver nanowire solution on the carrier in which the silver nanowire solution includes a plurality of silver nanowires, and a weight percentage concentration of the silver nanowires in the silver nanowire solution is between 0.01 wt. % and 0.2 wt. %.

In some embodiments of the present disclosure, the manufacturing method of the stretchable composite further includes: performing a heating treatment on the According to the aforementioned embodiments of the present disclosure, since the silver nanowire layer is partially embedded in the film, the silver nanowire layer can be firmly combined with the film. Therefore, when the stretchable composite electrode is stretched by external force, the silver nanowire layer will not produce local cracks or even fracture the whole piece while being stretched, and thus the stretchable composite electrode can be well applied in wearable electronic devices.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
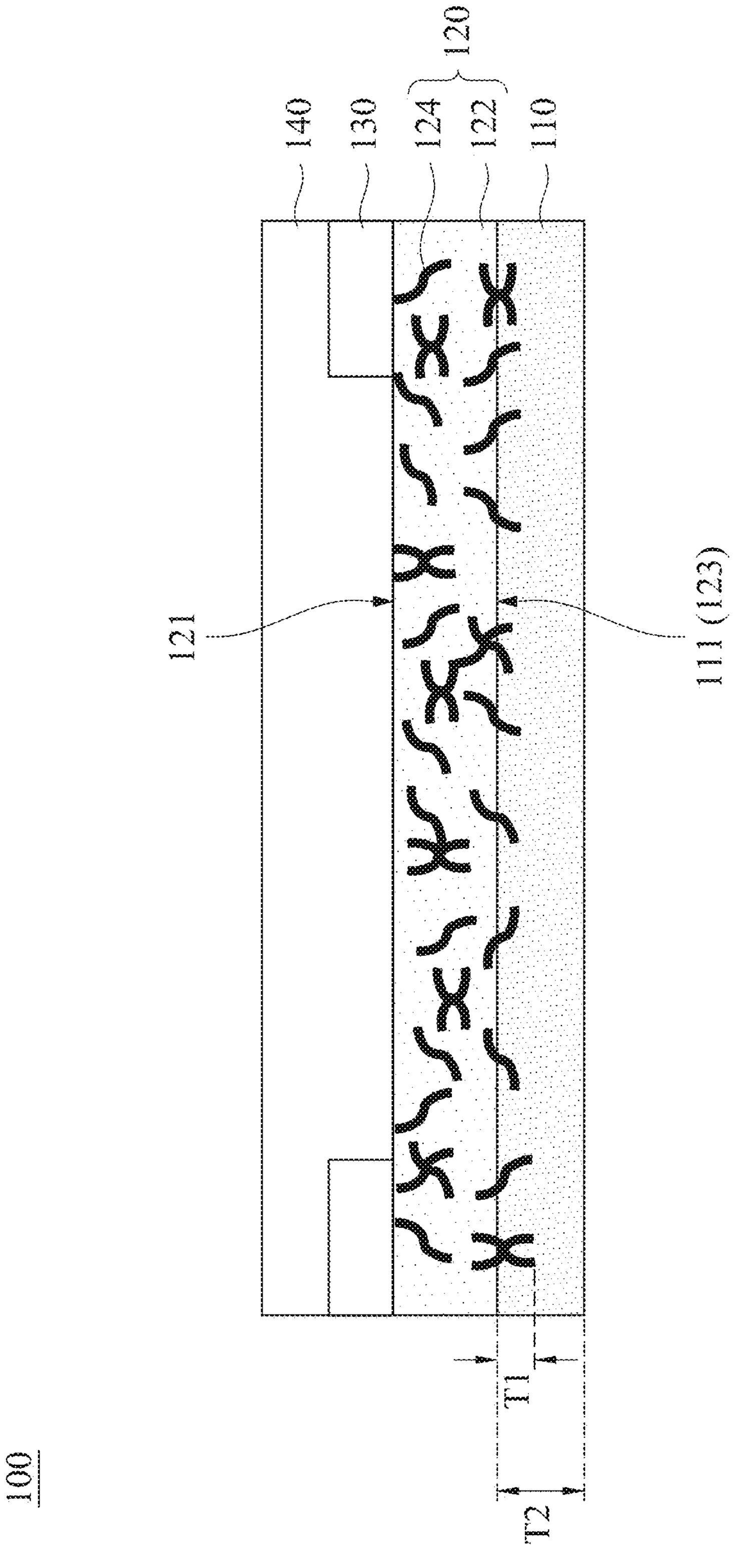
FIG. 1 is a schematic cross-sectional view illustrating a stretchable composite electrode according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It should be understood that, relative terms such as "lower" or "bottom" and "upper" or "top" can be used herein to describe the relationship between one element and another element, as shown in the figure. It should be understood that relative terms are intended to include different orientations of the device other than those shown in the figures. For example, if the device in one figure is turned over, elements described as being on the "lower" side of other elements will be oriented on the "upper" side of the other elements. Therefore, the exemplary term "lower" may include an orientation of "lower" and "upper", depending on the specific orientation of the drawing. Similarly, if the device in one figure is turned over, elements described as "below" other elements will be oriented "above" the other elements. Therefore, the exemplary term "below" can include an orientation of "above" and "below".

Reference is made to FIG. 1, which is a schematic cross-sectional view illustrating a stretchable composite electrode 100 according to some embodiments of the present disclosure. The stretchable composite electrode 100 includes a film 110 and a silver nanowire layer 120. The film 110 has a substantially flat surface 111. The material of the film 110 is a stretchable soft material. Preferably, the material of the film 110 is a polymer film with a Young's modulus ranging from 1.25 MPa to 3 MPa. The film 110 may be selected from poly(ethylene) oxide (PEO), low-density polyethylene (LDPE), ethylene-octene copolymer (EOC), poly(vinyl alcohol)/poly(N-isopropylacrylamide) copolymer (PVA-PNIPAm), rubber, polydimethylsiloxane (PDMS), combinations of the aforementioned materials, or mixtures of the aforementioned materials. It should be understood that the "substantially flat surface" mentioned in the present disclosure refers to a surface that is a flat on a macroscopic scale. On the other hand, the silver nanowire layer 120 is partially embedded in the surface 111 of the film 110. In some embodiments, the silver nanowire layer 120 may include a matrix 122 and a plurality of silver nanowires 124 distributed in the matrix 122, in which some of the silver nanowires 124 are embedded in the surface 111 of the film 110. That is, some of the silver nanowires 124 are embedded in the surface layer of the film 110 from the surface 111 of the film 110, and the remaining of the silver nanowires 124 are completely covered by the matrix 122.

Figure 2:
FIG. 2 is a scanning electron microscope (SEM) image of a stretchable composite electrode according to some embodiments of the present disclosure.

Reference is made to FIG. 2 for the aforementioned structural features, in which FIG. 2 is a scanning electron microscope (SEM) image of a stretchable composite electrode 100 according to some embodiments of the present disclosure. It can be seen from FIG. 2 that the silver nanowires 124 in the silver nanowire layer 120 are at least partially embedded in the surface 111 of the film 110, while the portions that are not embedded in the surface 111 of the film 110 are exposed. Accordingly, the silver nanowire layer 120 can be firmly combined with the film 110. Therefore, when the stretchable composite electrode 100 is stretched by external force (stress), the silver nanowire layer 120 will not produce local cracks or even fracture the whole piece.

Figure 3A:
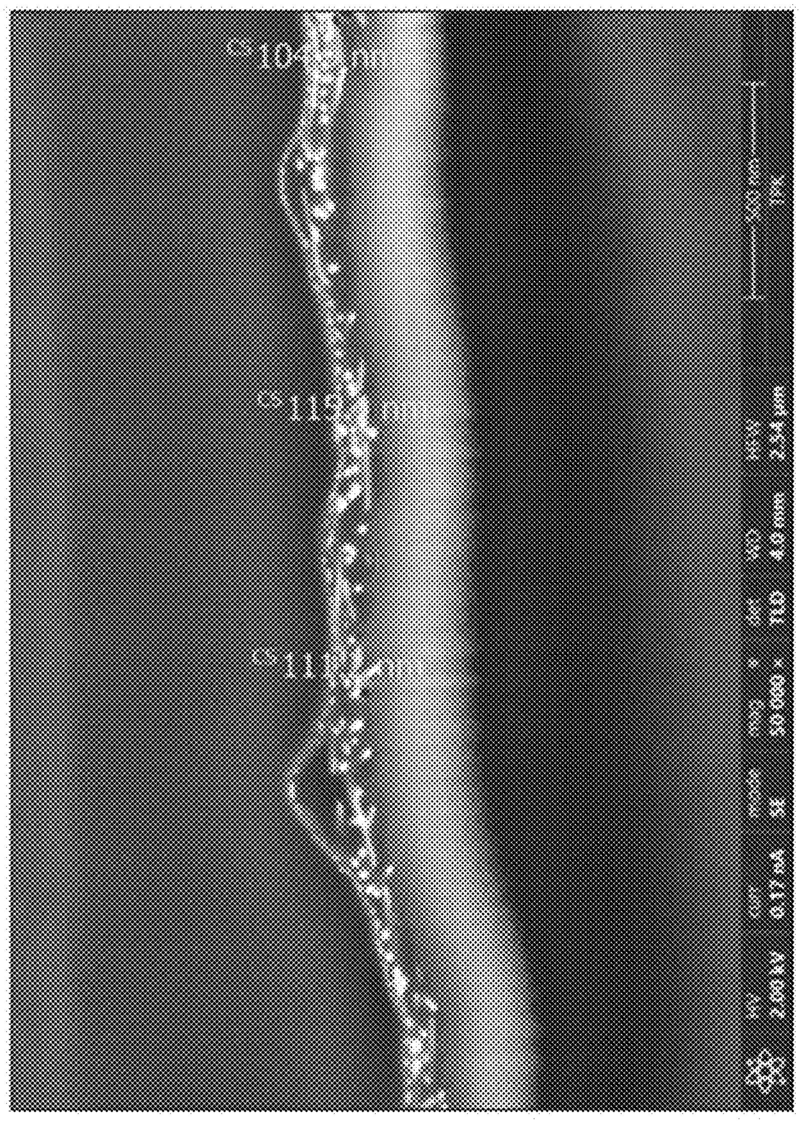
FIG. 3A to FIG. 3C are focused ion beam scanning electron microscope (FIB-SEM) images of stretchable composite electrodes according to various embodiments (Embodiments 1 to 3) of the present disclosure.
Figure 3B:
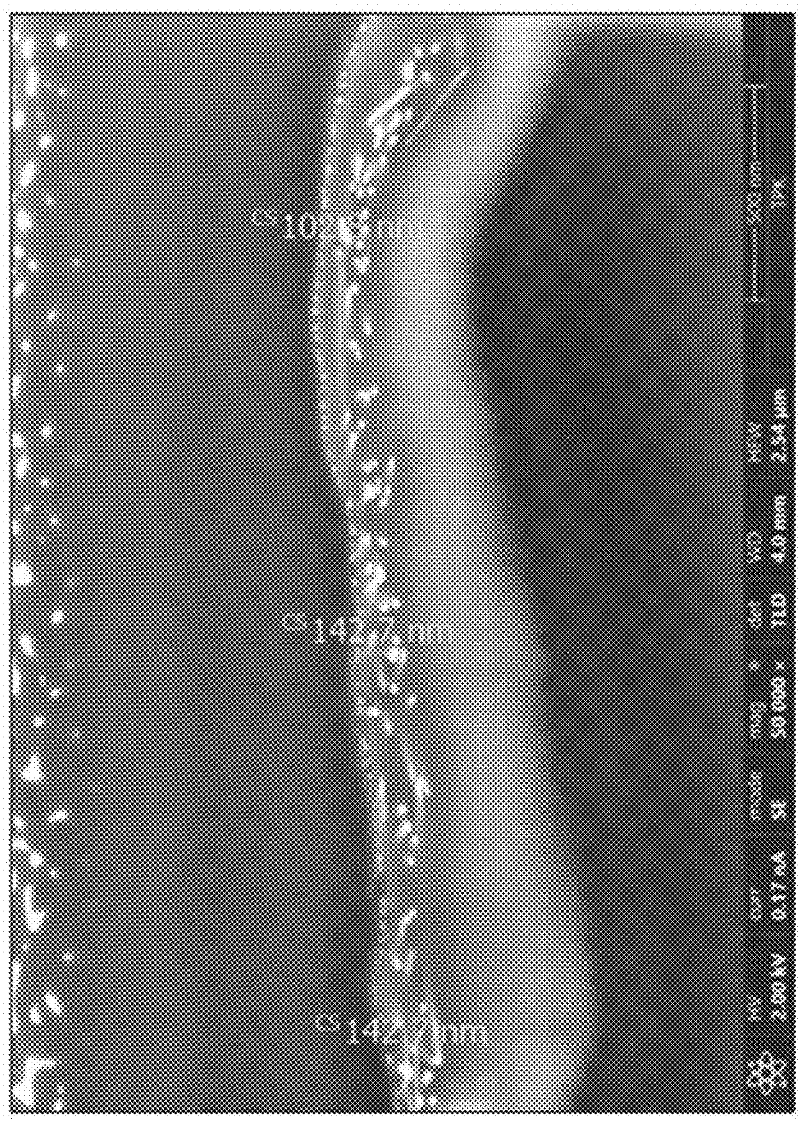
Figure 3C:
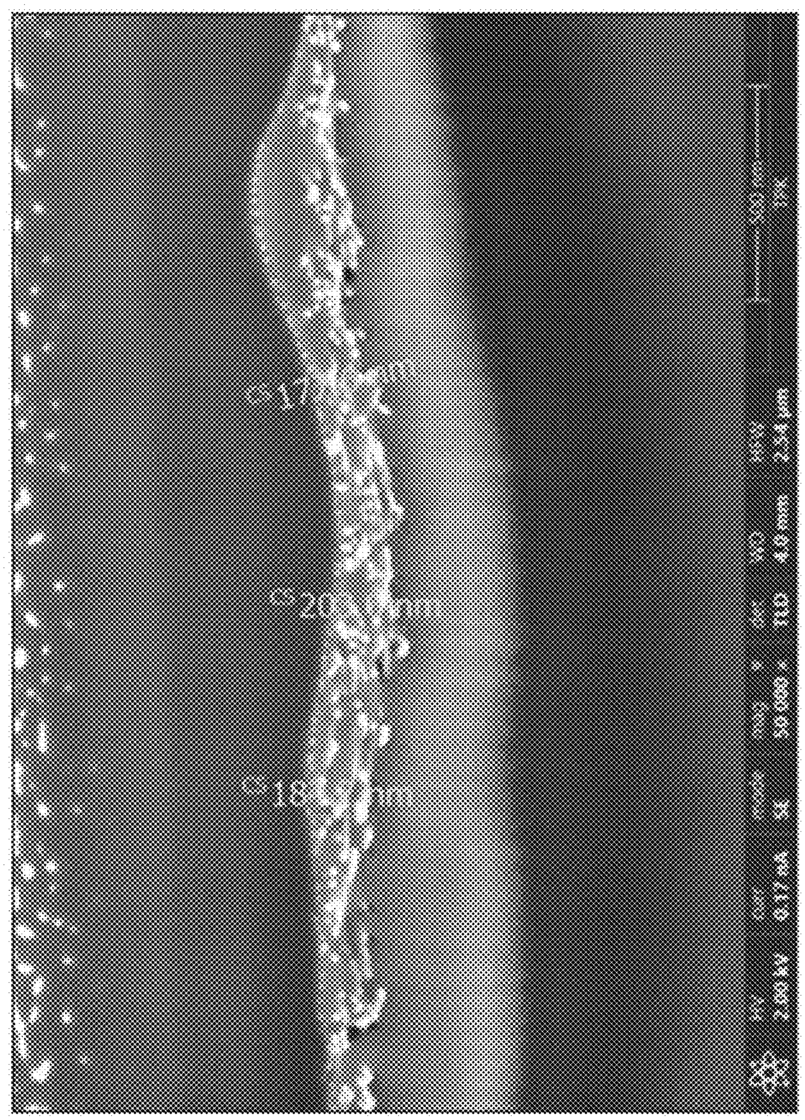

In some embodiments, a thickness T2 of the film 110 may be between 200 μm and 400 μm. In some embodiments, a thickness T1 of the silver nanowire layer 120 embedded in the film 110 can be 0.027% to 0.048% of the thickness T2 of the film 110, such that the silver nanowire layer 120 can be stably disposed on the film 110. Hence, the stretchable composite electrode 100 can withstand relatively large stretching deformation without electrical failure. For details, reference is made to FIG. 3A to FIG. 3C and Table 1, in which FIG. 3A to FIG. 3C are focused ion beam scanning electron microscope (FIB-SEM) images of stretchable composite electrodes according to various embodiments (Embodiments 1 to 3) of the present disclosure, and Table 1 lists the thickness T1 of the silver nanowire layer 120 that is embedded in the film 110 measured by FIG. 3A to FIG. 3C, in which the thickness T2 of the film 110 is 400 μm. It should be understood that, in FIG. 3A to FIG. 3C, the white dot-like image is the image of the silver nanowires 124.

TABLE 1

| thickness T1 of the silver nanowire layer 120 embedded in the film 110 (nm) | | | |
|---|---|---|---|
| measurement position (indicated by number) | Embodiment 1 (FIG. 3A) | Embodiment 2 (FIG. 3B) | Embodiment 3 (FIG. 3C) |
| #1 | 104.9 | 142.7 | 184.7 |
| #2 | 115.4 | 142.7 | 203.6 |
| #3 | 111.2 | 102.8 | 177.6 |
| average of #1, #2, and #3 | 110.5 | 129.4 | 188.6 |
| thickness T1/thickness T2 (expressed by percentage) | 0.0276% | 0.0323% | 0.0472% |

In some embodiments, the stretchable composite electrode 100 may further include a conductive layer 130 disposed on a surface 121 (also referred to as the first surface 121 hereinafter) of the silver nanowire layer 120 facing away from the film 110. The conductive layer 130 can be disposed at a suitable position (for example, at both ends of the stretchable composite electrode 100) to form a signal line of the stretchable composite electrode 100 for transmitting signals to external electronic components such as a controller. In some preferred embodiments, the material of the conductive layer 130 may include metallic silver. In some embodiments, when the silver nanowire layer 120 does not include the matrix 122, the silver nanowire 124 can also be at least partially embedded in the conductive layer 130 (not shown). That is, the conductive layer 130 can cover a portion of the silver nanowires 124.

In some embodiments, the stretchable composite electrode 100 may further include a protective layer 140 disposed on the surface 111 of the film 110 and completely covering the silver nanowire layer 120 and the conductive layer 130. The protective layer 140 can be, for example, pressure sensitive adhesive (PSA), and when the stretchable composite electrode 100 has optical requirements, the protective layer 140 can be, for example, optical clear adhesive (OCA). More specifically, the protective layer 140 may include rubber-based pressure sensitive adhesive, silicon-based material, and acrylic-based material. In some preferred embodiments, the material of the protective layer 140 may be an acrylic-based material.

The aforementioned structural features of the stretchable composite electrode 100 of the present disclosure will be more clearly illustrated through the description of the manufacturing steps below.

Figure 4:
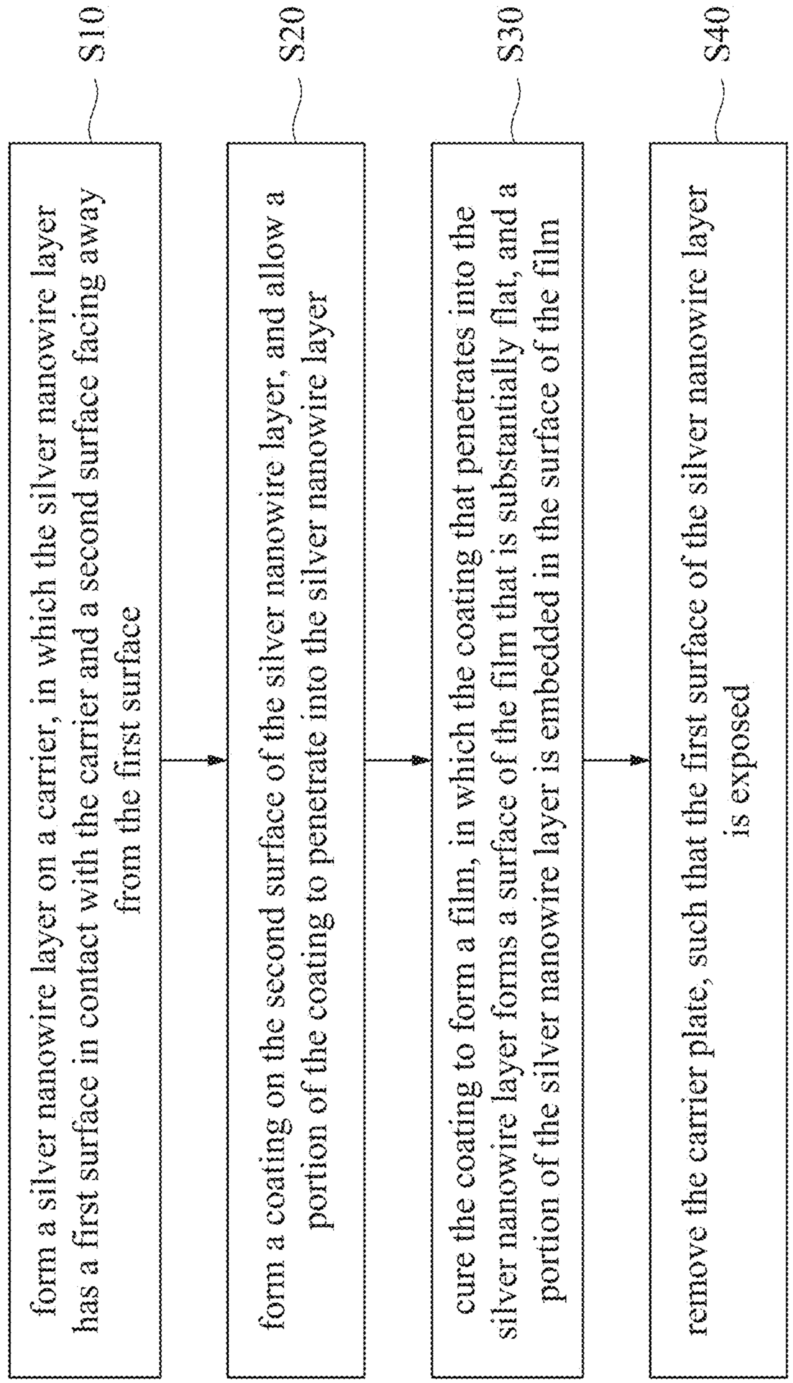
FIG. 4 is a flow chart illustrating a manufacturing method of a stretchable composite electrode according to some embodiments of the present disclosure.

Reference is made to FIG. 4, which is a flow chart illustrating a manufacturing method of a stretchable composite electrode 100 according to some embodiments of the present disclosure. In the following description, the steps of FIG. 4 in conjunction with FIG. 5A to FIG. 5F will be taken as an example to illustrate the manufacturing method of the stretchable composite electrode 100, in which FIG. 5A to FIG. 5F are schematic cross-sectional views illustrating a manufacturing method of a stretchable composite electrode 100 in different steps according to some embodiments of the present disclosure. The manufacturing method of the stretchable composite electrode 100 at least includes step S10 to step S40, and step S10 to step S40 can be performed sequentially.

Figure 5A:
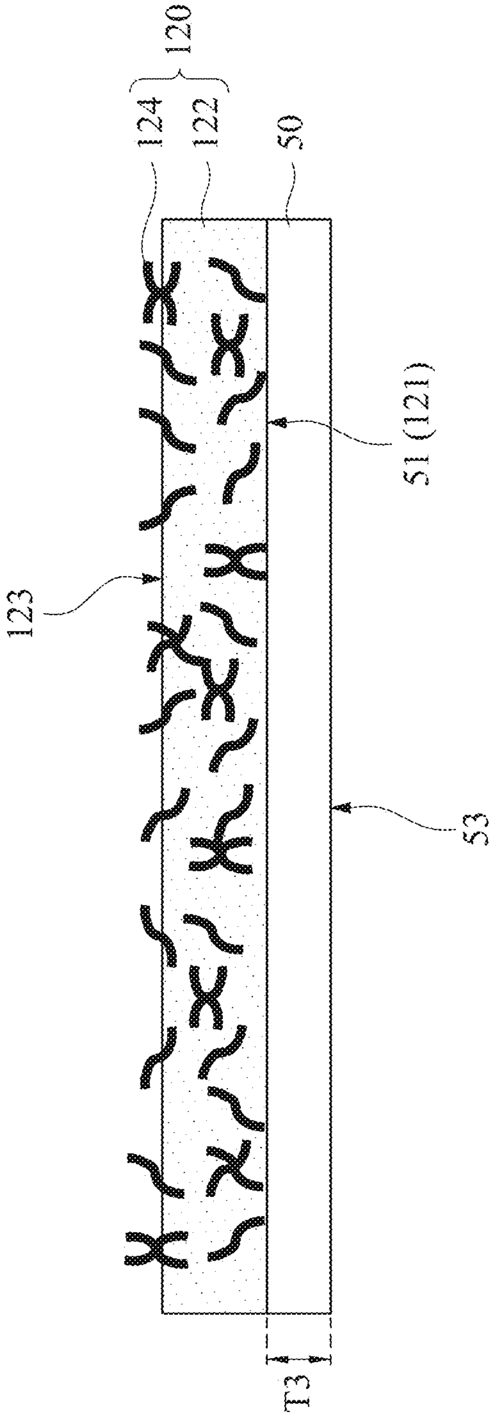
FIG. 5A to FIG. 5F are schematic cross-sectional views illustrating a manufacturing method of a stretchable composite electrode in different steps according to some embodiments of the present disclosure.

First, reference is made to FIG. 5A. In step S10, the silver nanowire layer 120 is formed on the carrier 50, in which the material of the carrier 50 may include polytetrafluoroethylene (PTFE). Specifically, the silver nanowire solution can be disposed on the surface 51 of the carrier 50 through processes such as screen printing, nozzle coating, or roller coating, and cured/dried on the surface 51 of the carrier 50 to form the silver nanowire layer 120. In some embodiments, the silver nanowire solution is obtained by diluting the silver nanowire ink with a solvent at a volume ratio of 1:0 to 1:30 (silver nanowire ink:solvent). In some embodiments, the solvent is isopropanol (IPA). For specific examples of the silver nanowire ink in the present disclosure, please refer to patent number WO2007022226, which is incorporated herein by reference in its entirety. In some embodiments, the silver nanowire ink can be selected from commercially available products, and is not particularly limited herein. In some embodiments, the silver nanowire ink is purchased from Cambrios Film Solution Corporation. The silver nanowire solution of the present disclosure includes a plurality of silver nanowires 124, and a weight percentage concentration of the silver nanowires can be between 0.01 wt. % and 0.2 wt. %, so as to take into account the electrical effect as well as the optical effect of the silver nanowire layer 120. In some embodiments, a roll-to-roll process can be used to coat the silver nanowire solution on the surface 51 of the continuously supplied carrier 50. In some embodiments, a mask can be used to form the silver nanowire layer 120 with patterns on the surface 51 of the carrier 50. Selecting PTFE as the material of the carrier 50 can prevent the silver nanowire layer 120 from sticking and remaining on the surface 51 of the carrier 50 during the transfer process of the roll-to-roll process.

In some embodiments, before forming the silver nanowire layer 120 on the carrier 50, annealing may be performed on the carrier 50, such that the carrier 50 has better stability, and the residual stress of the carrier 50 is eliminated, in which the annealing temperature may be between 140° C. and 160° C., and the annealing time may be between 2 minutes and 5 minutes. In some embodiments, after the silver nanowire layer 120 is formed on the surface 51 of the carrier 50, a curing process is performed to cure the formed silver nanowire layer 120 and to lower the junction resistance of the silver nanowire layer 120, in order to improve the electrical performance of the silver nanowire layer 120, in which the curing temperature can be between 140° C. to 160° C., and the curing time can be between 2 minutes to between 5 minutes. In some embodiments, heating treatment may be performed before and after forming the silver nanowire layer 120 on the carrier 50. In some embodiments, the heating treatment includes an annealing process, a curing process, and the like. In some embodiments, the heating treatment is performed by using an infrared (IR) sinter oven.

In some embodiments, the silver nanowire layer 120 can be formed by coating the silver nanowire solution on the surface 51 of the carrier 50, and the silver nanowire solution can be coated at a temperature between 110° C. and 130° C. In some embodiments, the stage heat of the carrier 50 can be set at 120° C. to perform the operation of coating the silver nanowire solution. After the silver nanowire layer 120 is formed, the silver nanowire layer 120 can be soft-baked at a temperature between 110° C. and 130° C. for 3 minutes, and then cured (hard-baked) to make the silver nanowire layer 120 have a low and stable resistance. In some embodiments, the hard baking temperature can be between 140° C. and 160° C., and the baking time can be between 2 minutes and 5 minutes. In some embodiments, the hard baking can be performed at 150° C. for 3 minutes. In some embodiments, the soft baking and hard baking can be done in an infrared sintering furnace. After step S10 is completed, the silver nanowire layer 120 including at least the silver nanowire 124 can be obtained, and the silver nanowire layer 120 has a first surface 121 in contact with the carrier 50 and a second surface 123 facing away from the first surface 121.

Figure 5B:
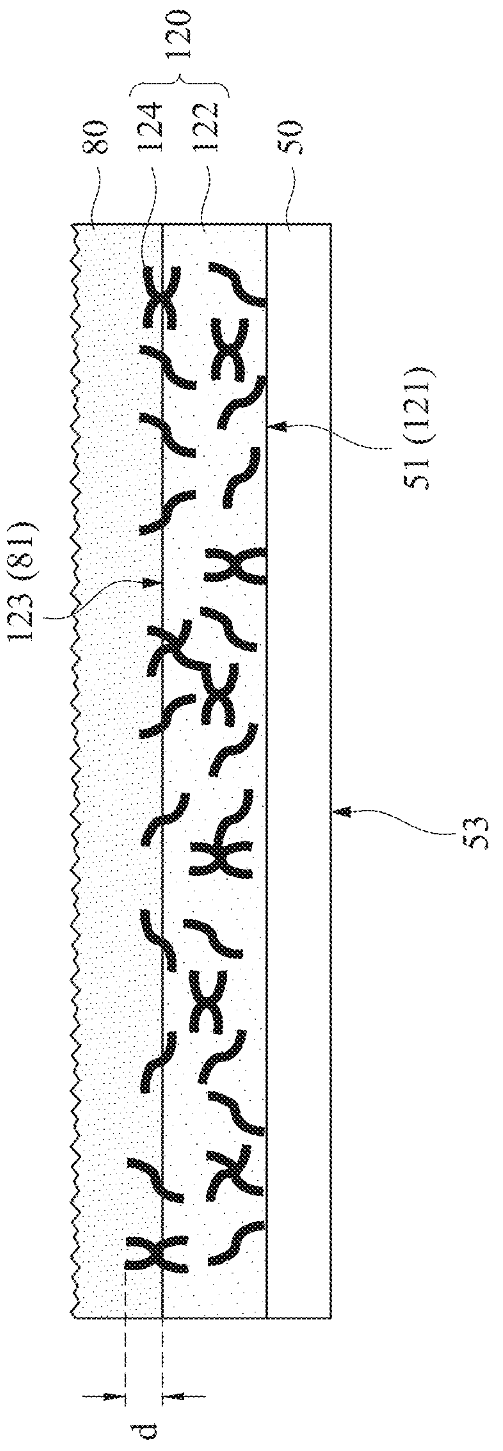

Next, reference is made to FIG. 5B. In step S20, a coating 80 is formed on the second surface 123 of the silver nanowire layer 120 to entirely cover the silver nanowire layer 120. In some embodiments, the coating 80 formed on the silver nanowire layer 120 forms a film by adding a curing agent. In some embodiments, the coating 80 forms a film through two-part mixing. In some embodiments, the film is made of a silicone rubber product purchased from Dow Chemical (trade name: SYLGARD™ 184 Silicone Elastomer Kit). In some embodiments, the coating 80 may be coated on the second surface 123 of the continuously supplied silver nanowire layer 120 by a roll-to-roll process. In some embodiments, the coating 80 includes polydimethylsiloxane (PDMS).

During step S20, a portion of the coating 80 will infiltrate into the silver nanowire layer 120, more specifically, a portion of the coating 80 will penetrate between the silver nanowires 124. In this way, the silver nanowires 124 in the silver nanowire layer 120 adjacent to the second surface 123 of the silver nanowire layer 120 can be partially embedded in the coating 80. On the other hand, the process of forming the coating 80 can make a depth d of the coating 80 that penetrated into the silver nanowire layer 120 at each position be substantially the same through a suitable method. That is, the coating 80 penetrating into the silver nanowire layer 120 can form a surface 81 that is substantially flat.

Figure 5C:
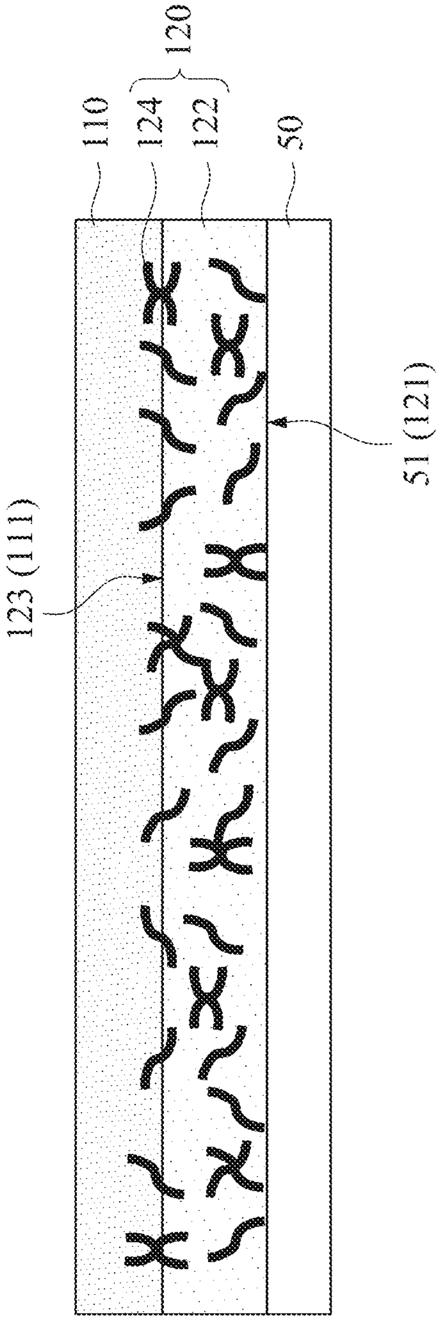

Subsequently, reference is made to FIG. 5C. In step S30, the coating 80 is cured and formed into a film 110. In some embodiments, after the coating 80 is formed, the coating 80 can be cured to form the film 110, in which the curing temperature can be between 140° C. and 160° C., and the curing time can be between 2 minutes and 5 minutes. Since the coating 80 infiltrated into the silver nanowire layer 120 can form a substantially flat surface 81 before the curing process, after the curing process, the surface 81 of the coating 80 can be cured to form a surface 111 of the film 110 that is substantially flat. In addition, it can be seen from the cured stacked structure that the silver nanowires 124 adjacent to the second surface 123 of the silver nanowire layer 120 are partially embedded in the surface 111 of the film 110. That is, the silver nanowires 124 adjacent to the second surface 123 of the silver nanowire layer 120 are partially embedded in the surface layer of the film 110 from the surface 111 of the film 110. Overall, after the curing process, the silver nanowire layer 120 is sandwiched between the carrier 50 and the film 110, in which some of the silver nanowires 124 in the silver nanowire layer 120 are distributed on the surface 51 of the carrier 50, some of the silver nanowires 124 in the silver nanowire layer 120 are distributed on the surface 111 of the film 110, and some of the silver nanowires 124 in the silver nanowire layer 120 are further embedded in the surface layer of the film 110. In some embodiments, the curing process can be integrated into a roll-to-roll process.

Figure 5D:
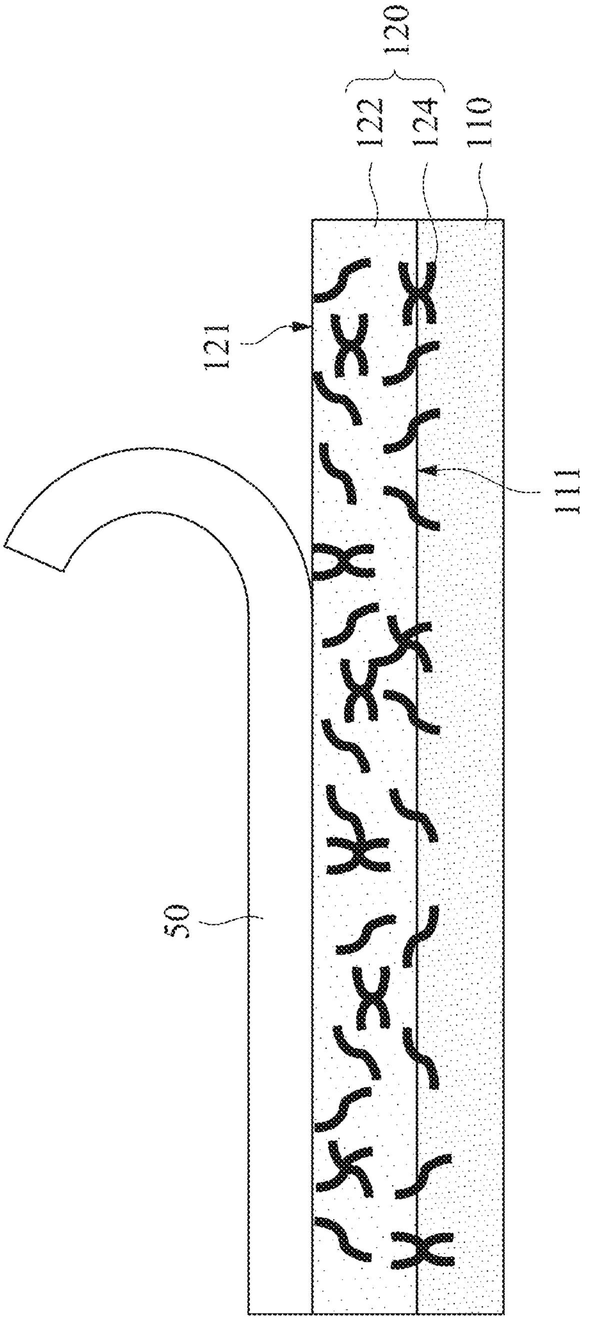

Next, reference is made to FIG. 5D. In step S40, the carrier 50 is removed to expose the first surface 121 of the silver nanowire layer 120. In detail, the stacked structure in FIG. 5C can be placed upside down, and the carrier 50 can be peeled off, leaving the film 110 and the silver nanowire layer 120 substantially disposed on the surface 111 of the film 110. Overall, after step S10 to step S40 are performed sequentially, the silver nanowire layer 120 can be transferred from the carrier 50 to the film 110 to form the stretchable composite electrode 100 of the present disclosure. In some embodiments, the removal of the carrier 50 can be integrated into a roll-to-roll process, for example, with suitable rollers.

Figure 5E:
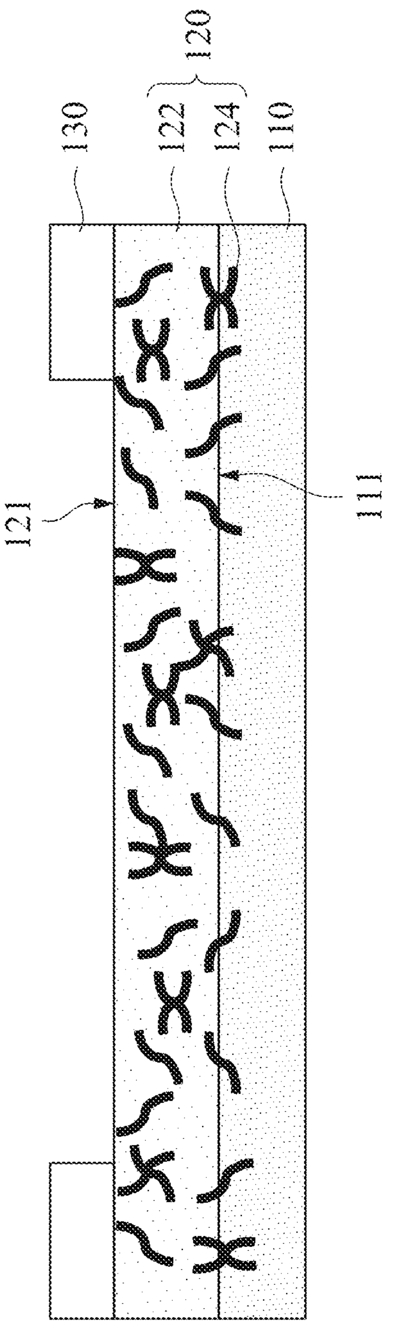

Subsequently, reference is made to FIG. 5E. In some embodiments, the manufacturing method of the stretchable composite electrode 100 may further include step S50, which includes forming a conductive layer 130 on the first surface 121 of the silver nanowire layer 120. In some embodiments, the slurry containing at least the material of the conductive layer 130 can be formed on the first surface 121 of the silver nanowire layer 120 through processes such as screen printing, nozzle coating, or roller coating, and then cured/dried to form the conductive layer 130 disposed on the first surface 121 of the silver nanowire layer 120. In some embodiments, a roll-to-roll process may be performed to coat the slurry on the first surface 121 of the continuously supplied silver nanowire layer 120. In some embodiments, a mask can be used to form a conductive layer 130 with patterns on the first surface 121 of the silver nanowire layer 120. In some preferred embodiments, the material of the conductive layer 130 can be silver, so as to provide better conductivity and stability of electrical conduction, and can withstand a certain degree of tensile stress, such that the fluctuation of the resistance of the stretchable composite electrode 100 is small when the stretchable composite electrode 100 is being stretched by external force, thereby improving the accuracy of the overall measurement.

In some embodiments, before forming the conductive layer 130, the silver nanowire layer 120 and the film 110 can be subjected to a surface plasma treatment, so as to facilitate the coating of the conductive layer 130 and the disposition of other subsequent layers (e.g., the protective layer 140). In detail, the silver nanowire layer 120 and the film 110 can be subjected to a surface plasma treatment from the side of the first surface 121 of the silver nanowire layer 120 to remove the residue attached to the surface of the silver nanowire 124, such that the silver nanowires 124 can be directly exposed to form contact with the conductive layer 130, and the adhesion between the film 110 and the conductive layer 130 and other subsequent layers (e.g., the protective layer 140) can be improved. In some embodiments, the surface plasma treatment can be carried out on the silver nanowire layer 120 and the film 110 simultaneously for 5 minutes with argon plasma at a power of 0.2 kW to 0.6 kW and a flow rate of 40 ML/min to 120 ML/min under vacuum for 10 minutes to achieve better results. It is worth noting that, compared with using oxygen plasma for surface plasma treatment, the use of argon plasma can reduce the possibility of oxidation of the silver nanowires 124 which leads to electrical failure. In some embodiments, the silver nanowire layer 120 and the film 110 may be subjected to solvent treating before or after the surface plasma treatment. In some embodiments, the solvent treating is performed by using a silicon-based surface treatment solvent.

In some embodiments, after the conductive layer 130 is formed, the slurry containing the silver material can be cured to form the conductive layer 130, in which the curing temperature can be between 100° C. and 120° C., and the curing time can be between 15 minutes and 25 minutes. In some embodiments, after the silver material is cured to form the conductive layer 130, the stretchable composite electrode 100 can further be pre-cut to a suitable size.

Figure 5F:
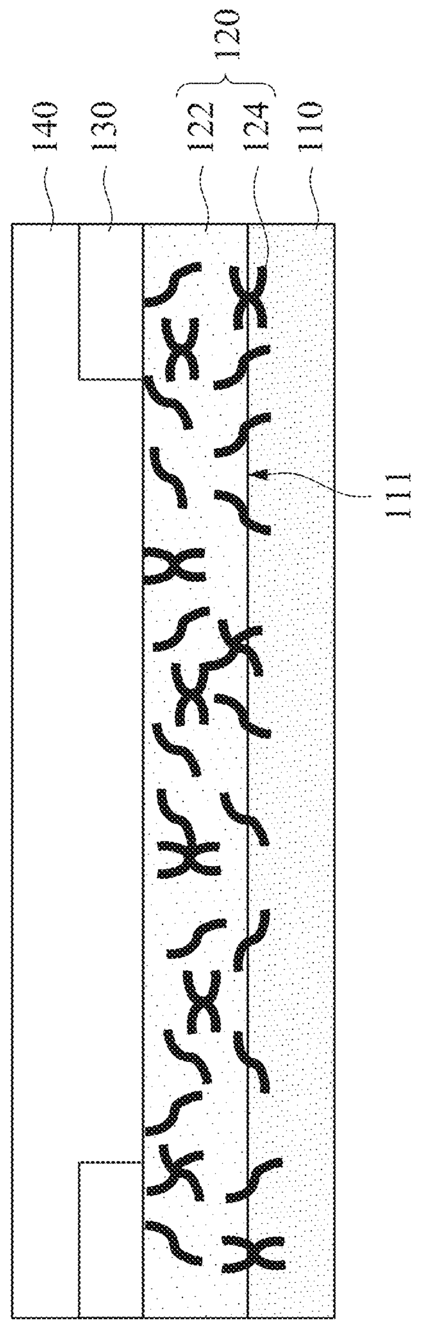

Next, reference is made to FIG. 5F. In some embodiments, the manufacturing method of the stretchable composite electrode 100 may further include step S60, which includes forming a protective layer 140 on the surface 111 of the film 110, such that the silver nanowire layer 120 and the conductive layer 130 are completely covered by the protective layer 140. In some embodiments, a material with strong adhesion to the film 110 can be selected as the material of the protective layer 140, such as a silicone-based material or an acrylic-based material. In addition, in an experiment, it was found that after the surface of the film 110 is treated by argon plasma, the adhesion between the acrylic material and the film 110 can be greatly improved. Therefore, the acrylic material is more suitable for being the material of the protective layer 140.

Figure 6:
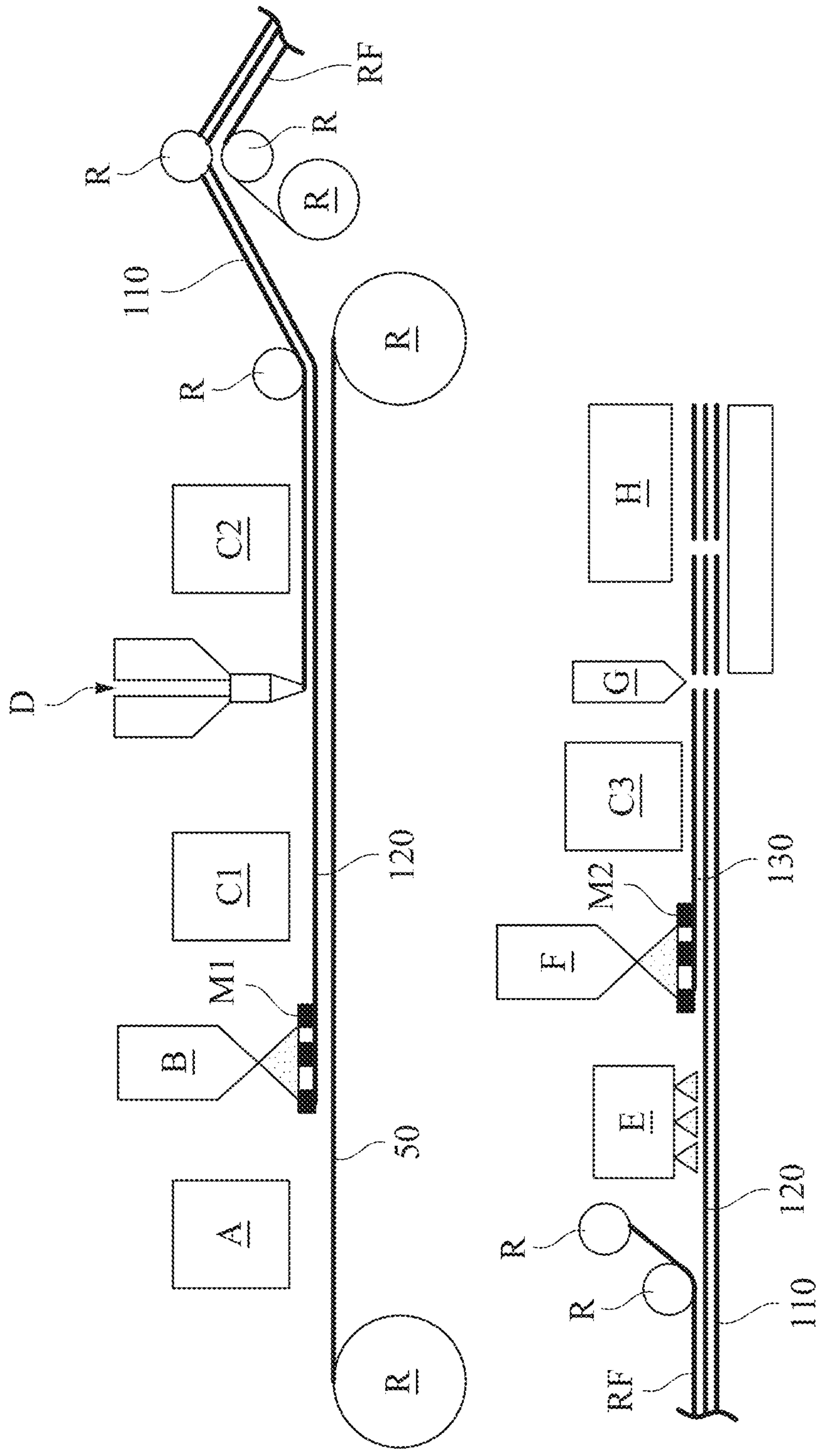
FIG. 6 is a schematic view illustrating an integration of the manufacturing method of a stretchable composite electrode into a roll-to-roll process according to some embodiments of the present disclosure.

Reference is made to FIG. 6, which is a schematic view illustrating an integration of the manufacturing method of a stretchable composite electrode 100 into a roll-to-roll process according to some embodiments of the present disclosure. As shown in FIG. 6, the carrier 50 can be continuously supplied by the roller R and then subjected to an annealing process A, a silver nanowire solution spraying B (M1 in the figure is a mask), and a curing process C1 to form the silver nanowire layer 120. Then, the formed structure is subjected to a coating spraying process D and a curing process C2 to form the film 110. Then, the stacked structure is placed up-side down and subjected to a surface plasma treatment process E to perform a surface treatment on the silver nanowire layer 120 and film 110. Then, the formed structure is subjected to a silver paste spraying process F (M2 in the figure is a mask) and a curing process C3 to form the conductive layer 130. Then, the formed structure is subjected to a cutting process G and a bonding process H to form the protection layer 140. In some embodiments, after removing the carrier 50, a protective film RF can be provided through the roller R to temporarily cover the silver nanowire layer 120, thereby protecting the silver nanowire layer 120, in which the protective film RF is removed before the surface plasma treatment process E. Overall, since the manufacturing method of the stretchable composite electrode 100 of the present disclosure can be integrated into a roll-to-roll process, mass production with production efficiency can be realized.

In the following description, a variety of experiments will be used to illustrate how the implementation details (for example, the selection of materials and the implementation methods of each step) are obtained when manufacturing the stretchable composite electrode 100 of the present disclosure, and features and effects of the present disclosure are verified through various experiments. It is noted that without exceeding the scope of the present disclosure, the materials used, their amount and ratio, processing details, processing flow, etc. can be appropriately alternated. Therefore, the present disclosure should not be limited by the embodiments provided below.

Experiment: Effect of Dilution Concentration of the Silver Nanowire Solution, Spraying Times, and Spraying Direction on the Electrical Performance of the Silver Nanowire Layer Regarding the step of forming the silver nanowire layer 120 on the carrier plate (i.e., step S10), the concentration of the silver nanowire 124 in the silver nanowire solution, the spraying times, and the direction of spraying can affect the overall coating uniformity of the silver nanowire layer 120, which further affects the electrical performance of the silver nanowire layer 120. Reference is made to Table 2, which shows the effects of the dilution concentration of the silver nanowire solution and the spraying conditions on the electrical performance of the silver nanowire layer 120 of Comparative Example 1. In Comparative Example 1, sample was formed by diluting the silver nanowire ink with isopropanol (solvent) to obtain a silver nanowire solution, then spraying the silver nanowire solution on the surface of the glass and baking the silver nanowire solution on the surface of the glass at a temperature of 120° C. for 3 minutes to form the silver nanowire layer 120, and then covering the silver nanowire layer 120 with a protective film RF (of which the material is polyethylene). The resistance was measured by eddy current. The parameters of the spraying machine are: atomization pressure of 0.1 MPa, valve pressure of 0.4 MPa, nozzle spacing of 8 mm, nozzle height of 40 mm, and valve speed of 75 mm/s.

TABLE 2

| dilution concentration (silver nanowire ink: solvent) (volume ratio) XY direction / valve scale / spraying time | 1:30 | 1:0 | | | 1:5 | | |
|---|---|---|---|---|---|---|---|
| | XY 1 2 | XY | 1 | 1 | XY | 1 | 1 |
| resistance (ops) randomly select 9 positions on the silver nanowire layer for measurement | electrical failure | 9.60 | 9.90 | 10.77 | 413 | 1273 | 1354 |
| | | 9.80 | 9.70 | 11.88 | 584 | 1447 | 2000 |
| | | 10.67 | 10.22 | 12.76 | 413 | 1273 | 1354 |
| baking times (times) | N/A | | 1 | | | 1 | |
| uniformity of resistance value (%) | N/A | | 14.1 | | | 65.8 | |
| XY direction / valve scale / spraying time | XY 1 4 | XY | 1 | 2 | XY | 1 | 2 |
| resistance (ops) randomly select 9 positions on the silver nanowire layer for measurement | electrical failure | 24.64 | 23.73 | 32.48 | 64.30 | 69.42 | 68.18 |
| | | 37.57 | 25.10 | 26.90 | 64.47 | 67.56 | 69.07 |
| | | 36.97 | 49.66 | 39 | 70.03 | 70.21 | 71.11 |
| baking times (times) | N/A | | 1 | | | 2 | |
| uniformity of resistance value (%) | N/A | | 35.3 | | | 5.0 | |

TABLE 2-continued

| XY direction valve scale spraying time | XY | 1 | 8 | YY | 1 | 2 | XY | 0.5 | 4 |
|---|---|---|---|---|---|---|---|---|---|
| resistance (ops) randomly select 9 positions on the silver nanowire layer for measurement | | electrical failure | | 180 | 191 | 205 | 36.76 | 37.10 | 38.10 |
| | | | | 187 | 233 | 220 | 37.29 | 38.09 | 41.13 |
| | | | | 193 | 245 | 260 | 36.84 | 38.48 | 41.28 |
| baking times (times) | | N/A | | | 2 | | | 1 | |
| uniformity of resistance value (%) | | N/A | | | 18.2 | | | 5.8 | |

Note 1:
If the “XY direction” is recorded as “XY”, it means to spray in the X direction firstly, and then to spray in the Y direction; if the “XY direction” is recorded as “YY”, it means to spray in the Y direction firstly, and then to spray in the Y direction again; the X direction and the Y direction are substantially vertical.
Note 2:
The “spraying times” represents the number of times of spraying in the X direction and the Y direction respectively. For example, if the “spraying direction” is recorded as “XY” and the “spraying times” is recorded as “2”, it means to spray twice in the X direction firstly, and then to spray twice in the Y direction.
Note 3:
If the “spraying direction” is recorded as “XY”, the “spraying times” is recorded as “2”, and the “baking times” is recorded as “1”, it means to spray twice in the X direction firstly, then to spray twice in the Y direction, and then to bake once.
Note 4:
If the “spraying direction” is recorded as “YY”, the “spraying times” is recorded as “1”, and the “baking times” is recorded as “2”, it means to spray once in the Y direction and then to bake once, and then to spray once more in the Y direction and then to bake once again.

It can be seen from the results shown in Table 2 that when the silver nanowire ink is diluted with isopropanol at a volume ratio of 1:5, the resulting silver nanowire solution has better sprayability, thereby improving the uniformity of the resistance. In addition, more spraying times (spraying multiple times in the X direction and Y direction) and more baking times can improve the uniformity of the resistance. Furthermore, smaller fluid velocity (smaller valve scale) is helpful to improve the uniformity of resistance. Based on the above results, the present disclosure can use any parameter in Table 2 to spray the silver nanowire solution.

Experiment: Selection of Materials of the Film

Figure 7A:
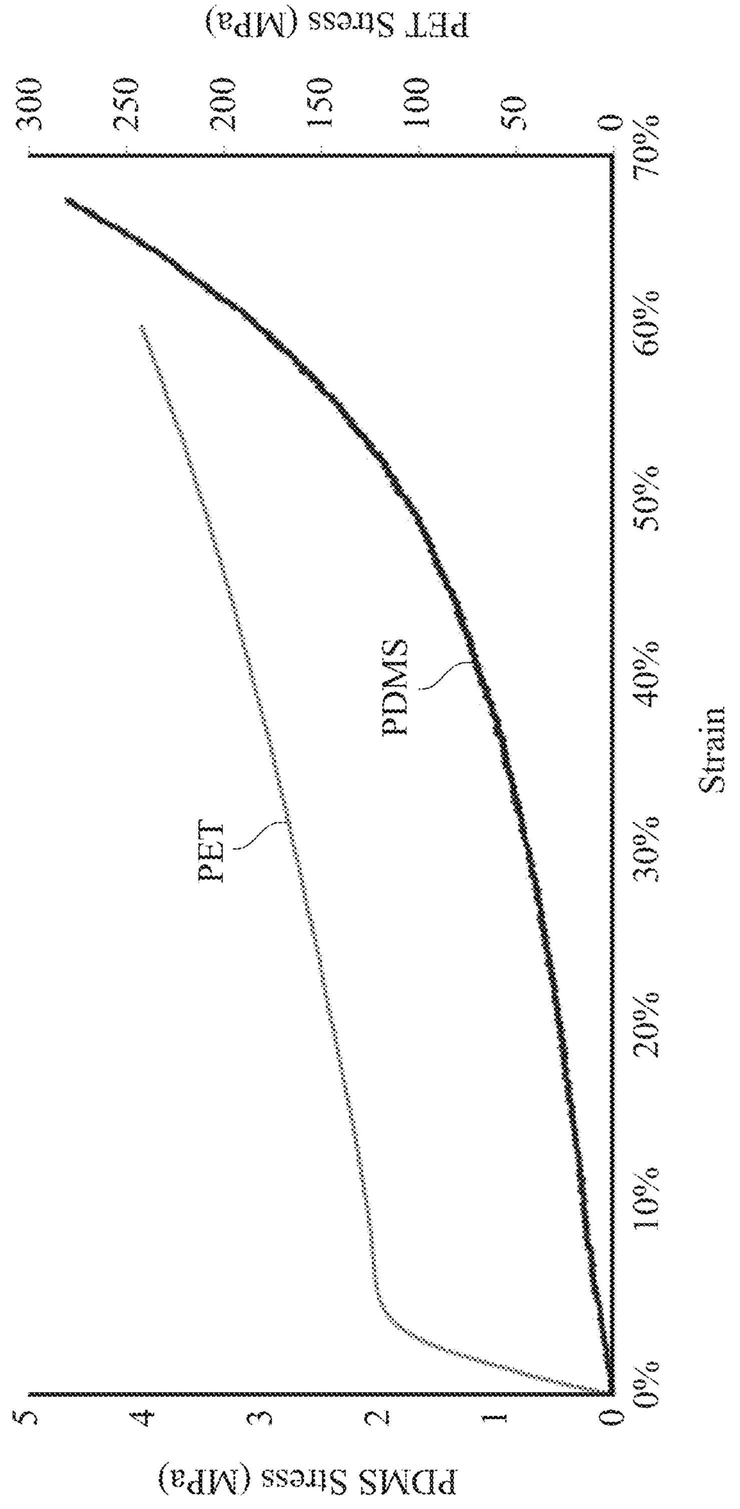
FIG. 7A shows the stress-strain curves of polyethylene terephthalate (PET) film and polydimethylsiloxane (PDMS) film.

When the silver nanowire layer 120 is disposed on the film 110 that is made by a material of PDMS and is partially embedded in the PDMS film 110, the stretchable composite electrode 100 can withstand greater stress (larger stretching deformation) without causing a sharp increase in resistance while being stretched. Specifically, reference is made to FIG. 7A, which shows the stress-strain curves of polyethylene terephthalate (PET) film and polydimethylsiloxane (PDMS) film, in which the thickness of the PET film was about 50 μm, and the thickness T2 of the PDMS film was about 400 μm. It can be seen from FIG. 7A that the stress-strain curve of the PET film has an obvious turning point when the strain is less than 10%, indicating that after the stress is removed, the PET film is prone to permanent deformation. In contrast, the stress-strain curve of the PDMS film has no obvious turning point, thereby having good tensile recovery, indicating that the PDMS film can be deformed significantly merely by applying a relatively small stress to the PDMS film. Based on the above, the stretchability and recovery of the stretchable composite electrode 100 can be improved by selecting PDMS as the material of the film 110.

Figure 7B:
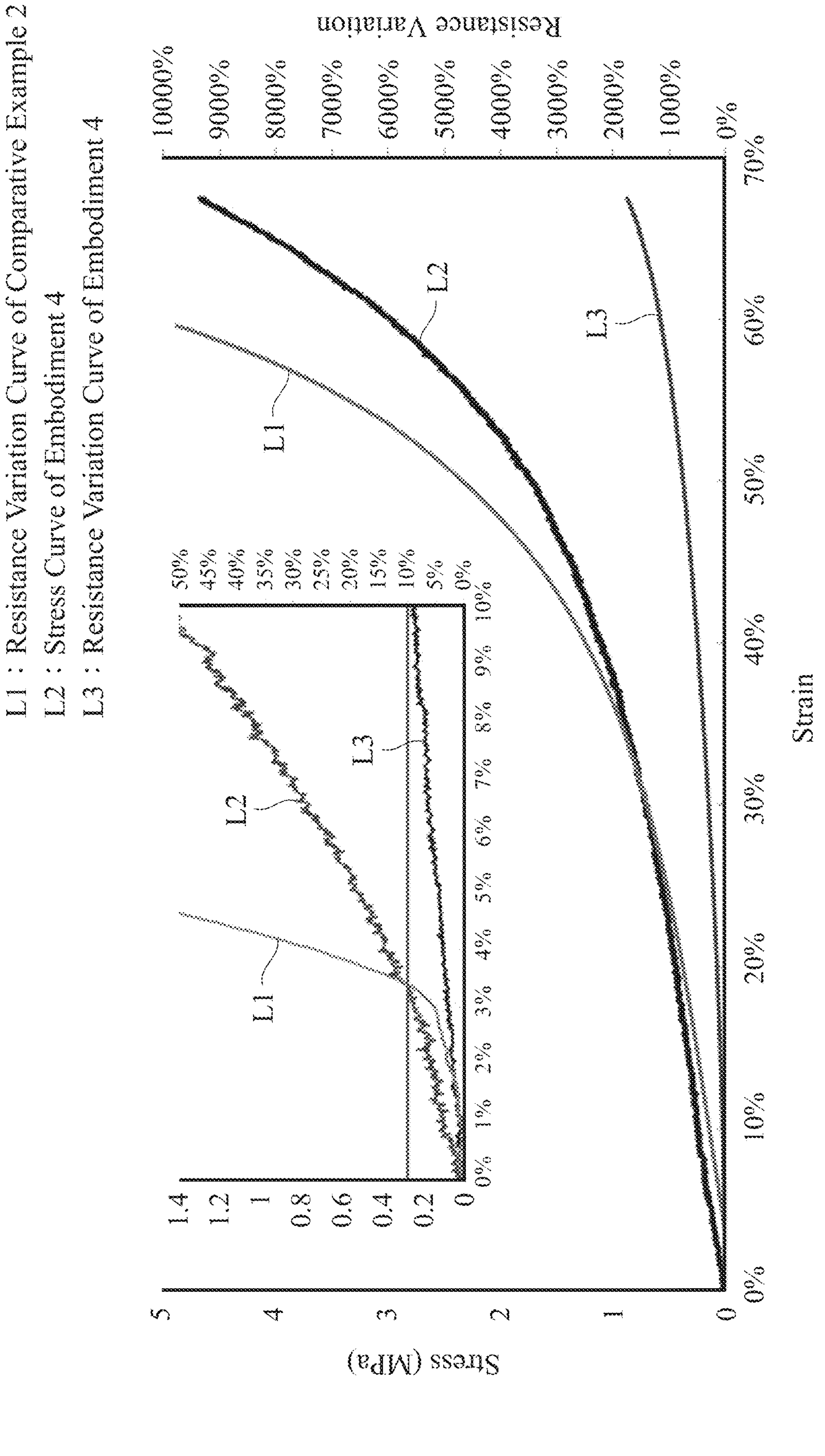
FIG. 7B shows the stress-strain curves and the resistance-strain curves of Embodiment 4 and Comparative Example 2.

Furthermore, reference is made to FIG. 7B, which shows the stress-strain curves and the resistance-strain curves of Embodiment 4 and Comparative Example 2. In Embodiment 4, the silver nanowire layer 120 (without pattern) was disposed on the PDMS film 110 through the aforementioned steps to form a test sample; and in Comparative Example 2, the silver nanowire layer (without pattern) was disposed on the PET film through the aforementioned steps to form a test sample. The thickness T2 of the PDMS film 110 was about 400 μm, the thickness of the PET film was about 50 μm, and Embodiment 4 and Comparative Example 2 are strip-shaped test samples with a size of about 90 mm×20 mm. In this experiment, the measurement method was to stretch the test samples by Instron tensile testing machine at a speed of 5 mm/min with an initial setting position of 50 mm, and at the initial stage where the test samples were in a tight state, the tensile applied were 0.08 N (for the PDMS film 110) and 0.18 N (for the PET film). It can be seen from FIG. 7B that when Embodiment 4 and Comparative Example 2 had a resistance variation of 10%, Embodiment 4 and Comparative Example 2 both had a strain of about 3.4%. In addition, when the strain continued to increase, the resistance variation of Embodiment 4 increased slowly, while the resistance variation of Comparative Example 2 increased sharply. It can be seen that compared with the selection of PET film, the selection of PDMS film 110 does not have much influence on the electrical performance of the stretchable composite electrode 100 when subjected to a small strain, and the selection of PDMS film 110 is beneficial to the electrical performance of the stretchable composite electrode 100 when subjected to a large strain.

Experiment: Effect of Surface Plasma Treatment to the Silver Nanowire Layer and the Film on the Adhesion of the Conductive Layer Regarding the effect of the step of carrying out a surface plasma treatment on the silver nanowire layer 120 and the film 110 on the adhesion of the conductive layer 130, in this experiment, a PDMS material was coated on the PET film and cured to form the PDMS film 110, then a vacuum oxygen plasma treatment and/or solvent surface treatment were carried out on the PDMS film 110, then a silver paste (brand/model: Phoenix AW02A) was coated on the PDMS film 110 that had undergone a surface treatment, and then the silver paste was sintered to form the conductive layer 130. Next, the conductive layer 130 is subjected to a tape test (100-grid test) to verify the effect of the surface plasma treatment on the adhesion of the conductive layer 130. Reference is made to Table 3 for the test results.

TABLE 3

| test sample No. | surface treatment: vacuum oxygen plasma treatment | surface treatment: solvent surface treatment | adhesion: 100-grid test result |
|---|---|---|---|
| #1 | No | No | fail |
| #2 | Yes | No | pass |
| #3 | No | Yes (brand/model: TF-223) | fail |
| #4 | No | Yes (brand/model: TF-666) | fail |
| #5 | Yes | Yes (brand/model: TF-666) | pass |

As can be seen from the results of Table 3, when no surface treatment is carried out on the silver nanowire layer 120 and the film 110, the test sample cannot pass the 100-grid test; when the silver nanowire layer 120 and the film 110 are treated with solvent surface treatment, but not treated with surface plasma treatment, the test sample cannot pass the 100-grid test; when the silver nanowire layer 120 and the film 110 are treated with surface plasma treatment, the test sample can pass the 100-grid test. It can be seen that the surface plasma treatment on the silver nanowire layer 120 and the film 110 has a positive impact on the adhesion of the conductive layer 130.

Figure 8:
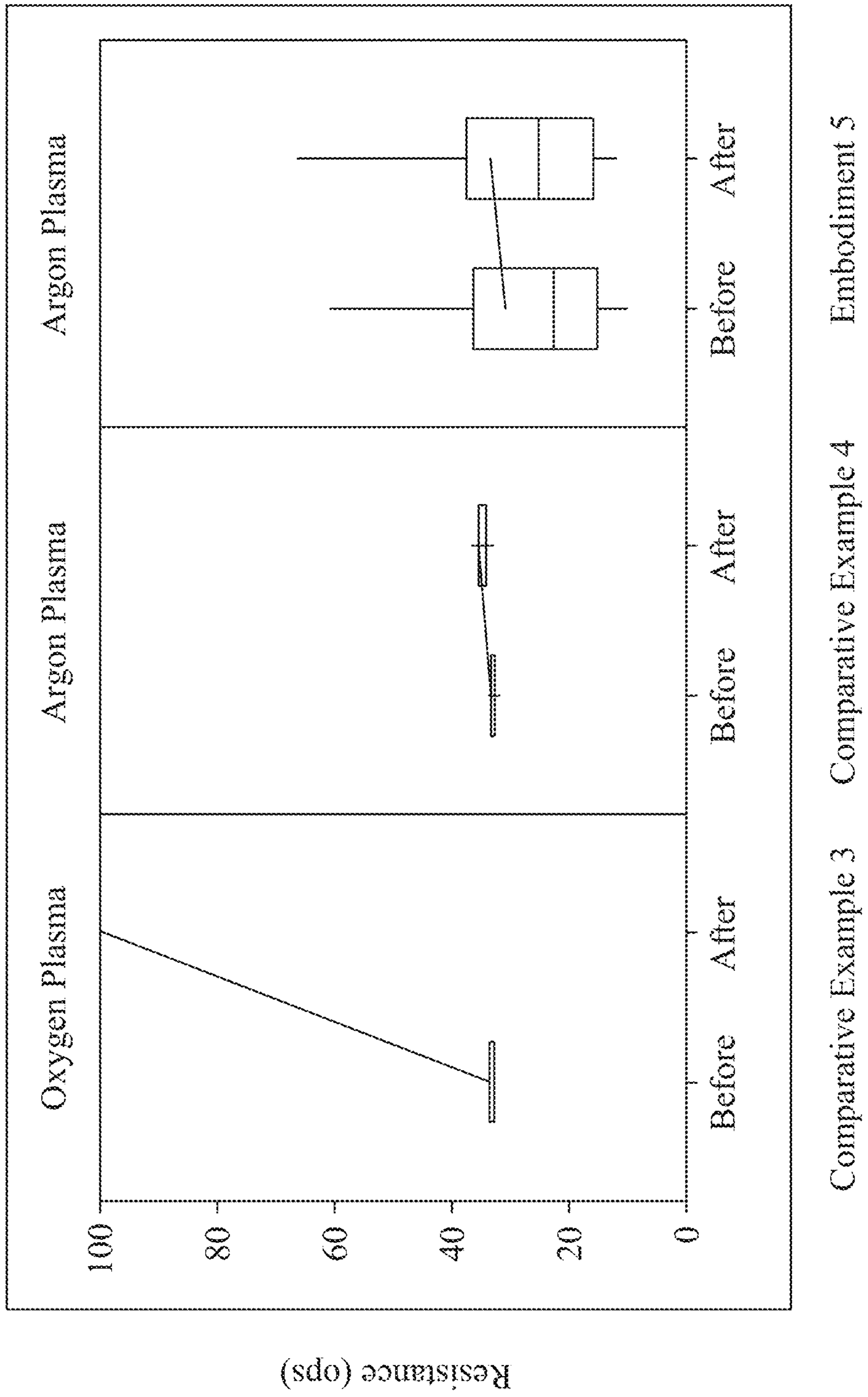
FIG. 8 shows the resistance variations of Comparative Examples 3 to 4 and Embodiment 5 before and after surface plasma treatment.

However, in another experiment, it was found that oxygen plasma would cause the silver nanowires 124 to oxidize and negatively affect the electrical function, while argon plasma could maintain the electrical function of the silver nanowires 124. Specifically, reference is made to FIG. 8, which shows the resistance variations of Comparative Examples 3 to 4 and Embodiment 5 before and after surface plasma treatment. In Comparative Examples 3 to 4, the silver nanowire layer 120 and the protective layer 140 were sequentially disposed on the surface of the PET film, and in Embodiment 5, the silver nanowire layer 120 was disposed on the surface of the PDMS film 110. It can be seen from Comparative Example 3 that after the surface treatment with oxygen plasma, the resistance of the silver nanowire layer 120 rises sharply. It can be seen from Comparative Example 4 and Embodiment 5 that after using argon plasma for surface treatment, the resistance of the silver nanowire layer 120 only slightly increases, and the floating range of the resistance is small, thereby maintaining the original electrical function. Therefore, in some embodiments of the present disclosure, the surface treatment to the silver nanowire layer 120 and the film 110 can be performed by a vacuum argon plasma process, so as to improve the adhesion of the conductive layer 130.

Figure 9A:
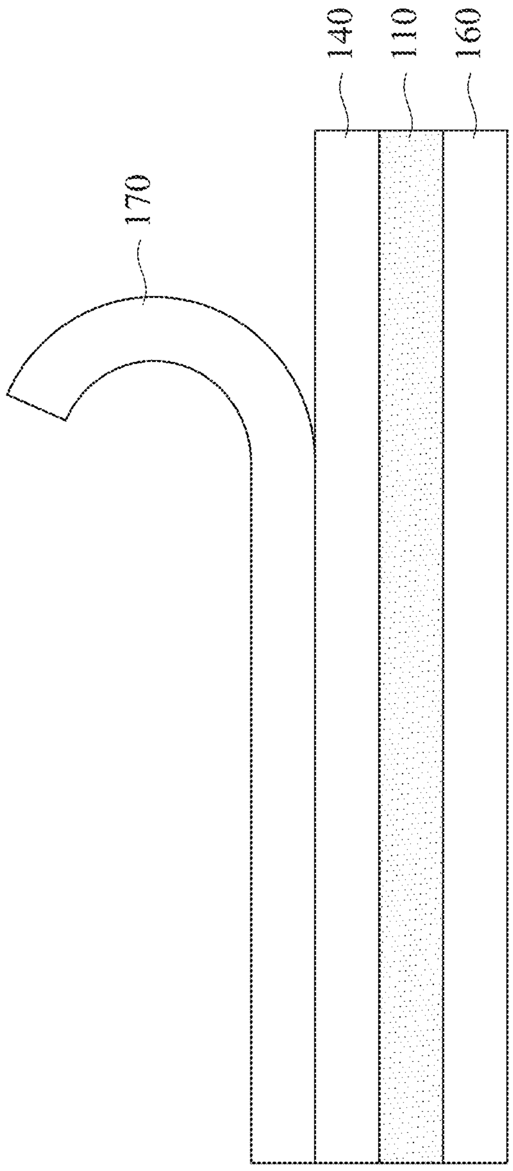
FIG. 9A and FIG. 9B respectively show a schematic view of a test and a test result of an experiment.
Figure 9B:
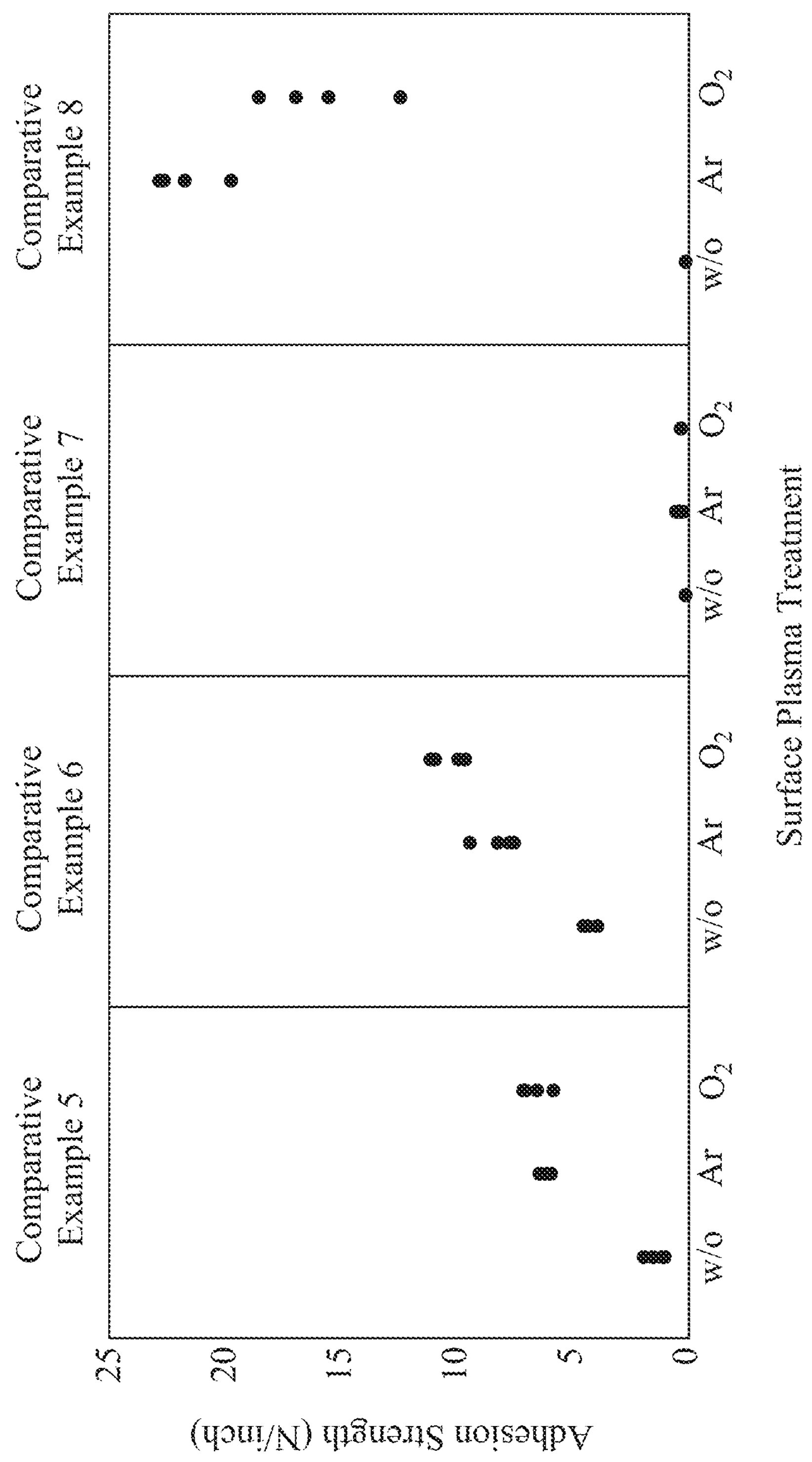

Experiment: Effect of Surface Plasma Treatment to the Film on the Adhesion Between the Protective Layer and the Film Regarding the effect of the step of carrying out surface plasma treatment on the PDMS film 110 on the adhesion between the protective layer 140 and the PDMS film 110, please refer to FIG. 9A. In this experiment, the PDMS film 110 was disposed on the glass 160 which had been surface-treated by vacuum oxygen plasma, then the protective layer 140 was disposed on the PDMS film 110, then the PDMS film 110 was selectively treated by vacuum oxygen or argon plasma surface treatment, then after a PET film 170 was disposed on the protective layer 140, the attachment/peeling of the protective layer 140 was observed by peeling off the PET film 170 (thickness of about 50 μm) at an angle of 180 degrees and at a rate of 300 mm/min. Reference is made to FIG. 9B for the test results, in which the protective layer 140 used in Comparative Example 5 was a pressure-sensitive adhesive, the material used for the protective layer 140 in Comparative Example 6 was a silicone-based material (model: Iwatani-TK50), the material used for the protective layer 140 in Comparative Example 7 was a rubber-based material (model: Tesa6156X), and the material used for the protective layer 140 in Comparative Example 8 was an acrylic-based material (model: 3M8146).

As can be seen from Comparative Example 7 of FIG. 9B, when the rubber-based material is selected as the material of the protective layer 140, no matter whether the PDMS film 110 is subjected to plasma surface treatment, the PDMS film 110 cannot be combined with the protective layer 140 with good adhesion. As can be seen from Comparative Examples 5, 6, and 8 in FIG. 9B, performing vacuum oxygen ($O_2$) or argon (Ar) plasma surface treatment on the PDMS film 110 can improve the adhesion between the protective layer 140 and the pressure-sensitive adhesive, silicone resin-based material, and acrylic-based material, and especially the acrylic-based material. Based on the above results, in some embodiments of the present disclosure, the pressure-sensitive adhesive, silicone resin-based material, and acrylic-based material can be selected as the material of the protective layer 140, and before the protective layer 140 is provided, the PDMS film 110 can be treated with surface plasma treatment, and preferably with vacuum argon plasma surface treatment.

Experiment: Effect of Embedding Silver Nanowires in the Film on the Electrical Performance of the Stretchable Composite Electrodes In this experiment, through the measurement of the water contact angle (WCA) (test 1) and the measurement of the resistance (test 2), the effect of embedding the silver nanowires 124 in the film 110 on the electrical performance of the stretchable composite electrode 100 is reflected. In Test 1, a PDMS material was coated on the PET film and cured to form the PDMS film 110, then the PDMS film 110 was selectively treated by a vacuum surface treatment with oxygen plasma, then the silver nanowire solution containing the silver nanowires 124 was sprayed onto the PDMS film 110, and then three measurement points (No. #1-#3) were randomly selected to measure the water contact angle between the silver nanowire solution and the PDMS film 110. In Test 2, a PDMS material was coated on the PET film and cured to form a PDMS film 110, then the PDMS film 110 was subjected to a vacuum surface treatment with oxygen plasma, then the silver nanowire solution containing the silver nanowires 124 was sprayed onto the PDMS film 110 and cured to form a silver nanowire layer 120, then a pressure-sensitive adhesive was formed on the silver nanowire layer 120, and then nine measurement points (No. #1-#9) of the entire stacked structure were randomly selected to measure the resistance. The result of each test is shown in Table 4.

TABLE 4

| oxygen plasma pressure: 45 Pa | | | | | Resistance (ops) | | |
|---|---|---|---|---|---|---|---|
| oxygen plasma flow rate: 80 ml/min | | water contact angle (degree) | | | #1<br>#4 | #2<br>#5 | #3<br>#6 |
| power (W) | time (s) | #1 | #2 | #3 | #7 | #8 | #9 |
| N/A | | 115.1 | 116.1 | 114.8 | — | — | — |
| | | | | | — | — | 1170 |
| | | | | | — | 1138 | — |
| 200 | 300 | 64.7 | 69.2 | 65.3 | — | 454.0 | 383.3 |
| | | | | | 114.3 | 543.0 | 148.8 |
| | | | | | — | 369.0 | 126.9 |
| 200 | 600 | 73.1 | 64.5 | 69.3 | 432.3 | 305.7 | 1370.0 |
| | | | | | 73.9 | 168.9 | 962.0 |
| | | | | | 1313.7 | 291.6 | — |
| 400 | 300 | 53.3 | 53.8 | 56.8 | 322.4 | 198.4 | 212.9 |
| | | | | | 169.4 | 242.1 | 357.5 |
| | | | | | 222.3 | 243.0 | 312.5 |
| 600 | 300 | 69.1 | 68.7 | 69.7 | 228.0 | 93.5 | 209.7 |
| | | | | | 119.7 | 80.9 | 207.3 |
| | | | | | 162.3 | 164.8 | 579.6 |

Note:
When the resistance is recorded as "—", it means that the resistance is too large and cannot be measured.

As can be seen from the water contact angle measurement results in Table 4, the vacuum surface treatment to the PDMS film 110 can greatly reduce the water contact angle between the silver nanowire solution and the PDMS film 110. However, even if the vacuum surface treatment is performed, it is still impossible to completely prevent the silver nanowire solution from agglomerating into water droplets on the surface of the PDMS film 110, and it is impossible to improve the film-forming properties of the silver nanowire solution. In addition, it can be seen from the resistance measurement results in Table 4 that even if the PDMS film 110 is subjected to vacuum surface treatment, the silver nanowire layer 120 formed on the PDMS film 110 still has a relatively large resistance. It can be seen that it is difficult to form the silver nanowire layer 120 by directly spraying the silver nanowire solution on the surface of the PDMS film 110 in practice. Based on the above results, the present disclosure forms the silver nanowire layer 120 on the PDMS film 110 by transferring, such that the silver nanowire layer 120 can be partially embedded in the PDMS film 110, which is beneficial for the silver nanowire layer 120 to be firmly disposed on the film 110, such that the silver nanowire layer 120 can have a relatively small resistance when subjected to tensile stress.

Experiment: Electrical Test on Electrodes During Stretching

Figure 10A:
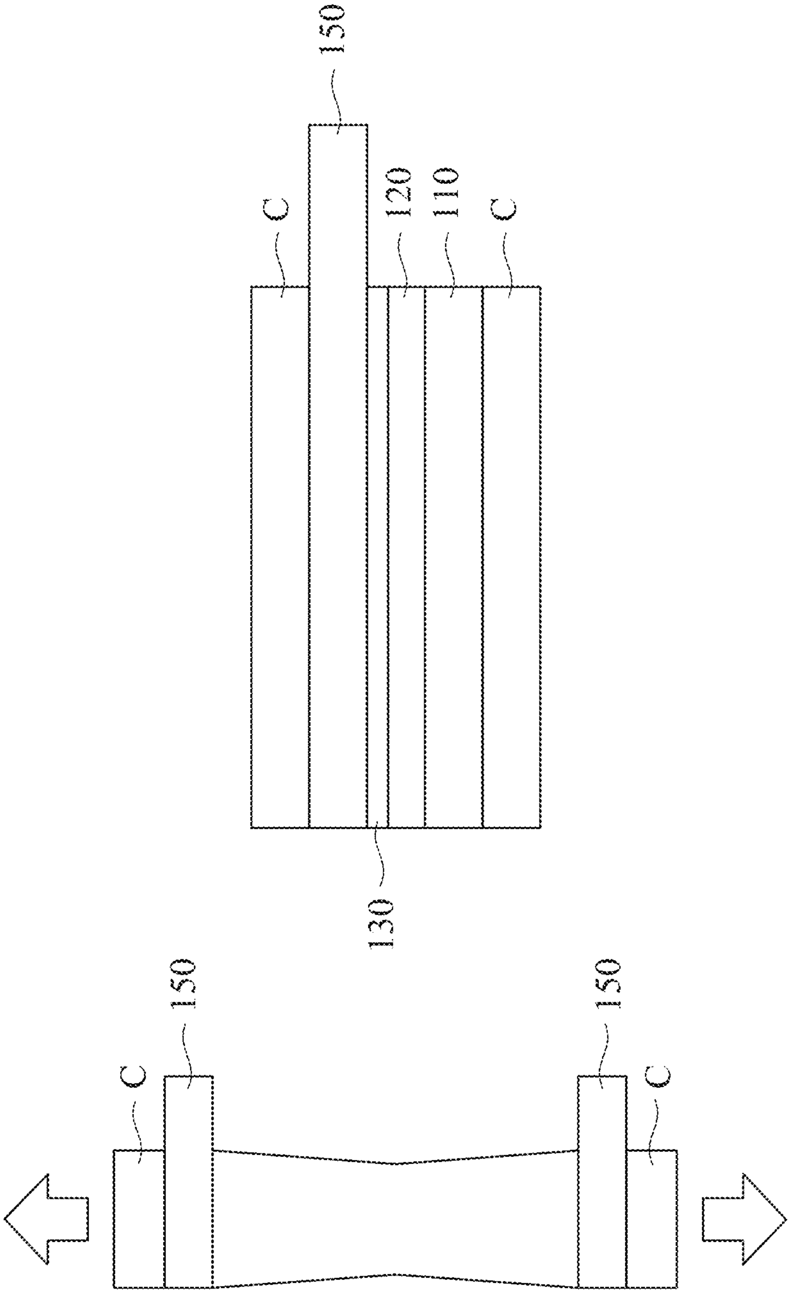
FIG. 10A shows a stretching direction and a schematic stacked view of the electrode of Comparative Example 9.
Figure 10B:
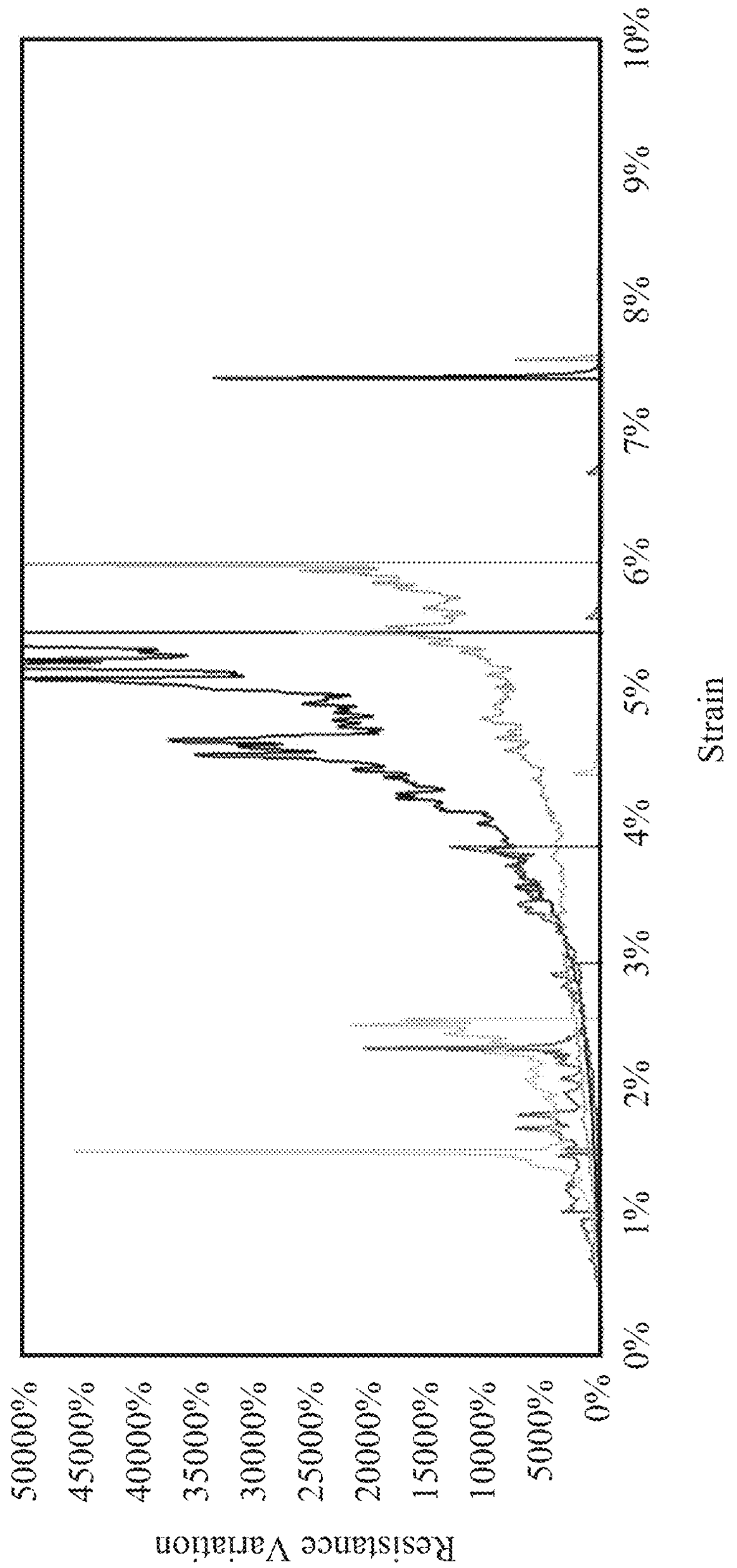
FIG. 10B shows a resistance-strain curve of the electrode of Comparative Example 9.
Figure 11A:
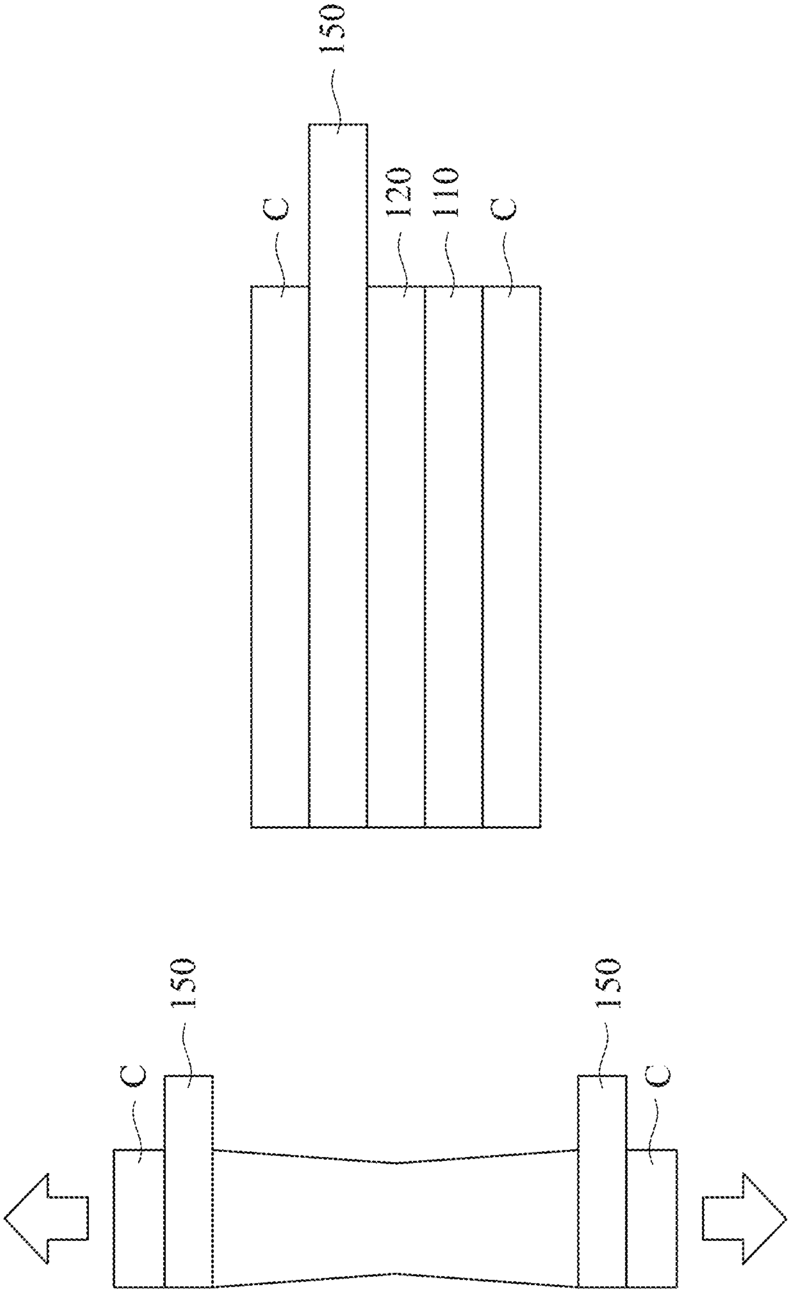
FIG. 11A shows a stretching direction and a schematic stacked view of the stretchable composite electrode of Embodiment 6.
Figure 11B:
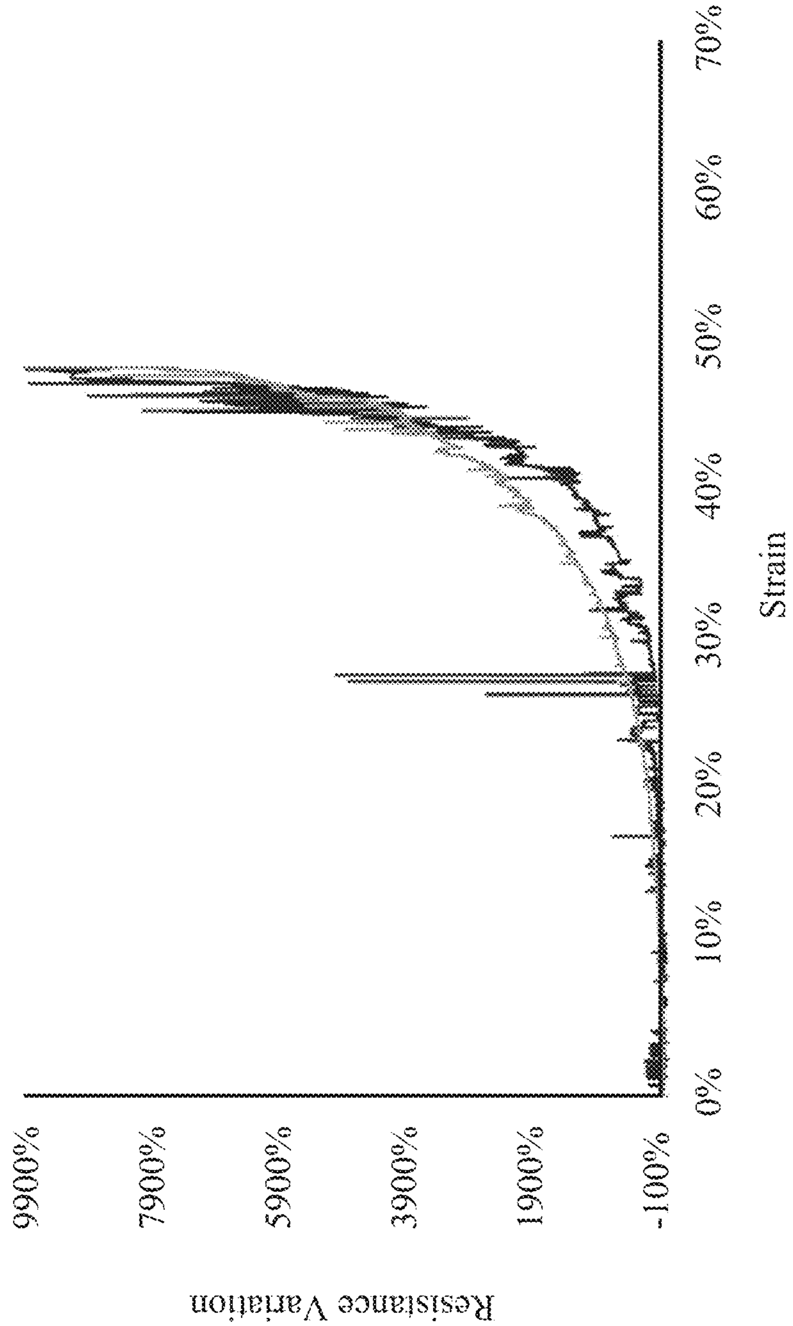
FIG. 11B shows a resistance-strain curve of the stretchable composite electrode of Embodiment 6.

In this experiment, the electrode of Comparative Example 9 and the stretchable composite electrode of Example 6 were stretched multiple times (using multiple test samples to stretch once), and the electrical tests were carried out during multiple stretches. The measurement method was to stretch the test samples by Instron tensile testing machine at a speed of 5 mm/min with an initial setting position of 50 mm, and at the initial stage where the test samples were in a tight state, the tensile applied was 0.08 N. The resistance variation of each test sample during stretching and the strain at the time of open circuit was measured. More specifically, reference is made to FIG. 10A to FIG. 11B, in which FIG. 10A shows a stretching direction and a schematic stacked view of the electrode of Comparative Example 9, FIG. 10B shows a resistance-strain curve of the electrode of Comparative Example 9, FIG. 11A shows a stretching direction and a schematic stacked view of the stretchable composite electrode of Embodiment 6, and FIG. 11B shows a resistance-strain curve of the stretchable composite electrode of Embodiment 6. The manufacturing method of the electrode of Comparative Example 9 was to form the PDMS film 110 firstly, then carry out a vacuum surface treatment to the PDMS film 110 with oxygen plasma, then spray the silver nanowire solution containing at least the silver nanowires 124 on the PDMS film 110 and cure the silver nanowire solution to form the silver nanowire layer 120 on the entire surface, and then dispose the conductive layer (silver layer) 130 on the silver nanowire layer 120. When performing the electrical test on Comparative Example 9, the stacked structure included the PDMS film 110, the silver nanowire layer 120, the conductive layer 130, and the conductive cloth 150 sequentially disposed from bottom to top, and the stack was clamped with clamps C to assist in the measurement, in which the stretching direction was the direction of the arrow shown in FIG. 10A. The manufacturing method of the stretchable composite electrode of Embodiment 6 was to adopt the manufacturing method disclosed in the present disclosure (steps S10 to S40). When performing the electrical test on Embodiment 6, the stacked structure included the PDMS film 110, the silver nanowire layer 120 covering an entire surface of the PDMS film 110, and the conductive cloth 150 sequentially disposed from bottom to top, and the stack was clamped with clamps C to assist in the measurement, in which the stretching direction was the direction of the arrow in shown FIG. 11A. In addition, each of Comparative Example 9 and Embodiment 6 was an elongated test sample with a size of about 90 mm×20 mm. In addition, Table 5 below shows the strain of the electrode of Comparative Example 9 and the stretchable composite electrode of Embodiment 6 when an open circuit occurs during the electrical test.

TABLE 5

| test sample No. of Comparative Example 9 | strain at open circuit (%) | test sample No. of Embodiment 6 | strain at open circuit (%) |
|---|---|---|---|
| #1 | 5.60 | #1 | 77 |
| #2 | 2.98 | #2 | 72 |
| #3 | 6.15 | #3 | 66 |
| #4 | 2.00 | #4 | 26 |
| #5 | 0.89 | #5 | 26 |
| #6 | 1.50 | #6 | 44 |
| #7 | 2.61 | #7 | 13 |
| #8 | 3.95 | #8 | 19 |
| — | — | #9 | 20 |

Note 1:
The stacked structure of the test samples No. #4 to #6 of Embodiment 6 is shown in FIG. 10A.
Note 2:
The stacked structure of test sample No. #7 to #9 in Embodiment 6 additionally includes a protective layer (pressure-sensitive adhesive) 140 disposed between the conductive layer 130 and the conductive cloth 150 on the basis of the stacked structure shown in FIG. 10A.

For Comparative Example 9, it can be seen from FIG. 1013 that Comparative Example 9 cannot withstand a large stretch after repeated tests, and a resistance of Comparative Example 9 is not stable and will rise sharply during stretching. Also, it can be seen from Table 5 that the strain of Comparative Example 9 is relatively small when a circuit open occurs during stretching, and thus Comparative Example 9 is less able to withstand external force stretching. For Embodiment 6, it can be seen from FIG. 11B that Embodiment 6 can withstand a relatively large stretch after multiple tests, and a resistance of Embodiment 6 changes less and is relatively stable during stretching. Also, it can be seen from Table 5 that the strain of Embodiment 6 when the circuit open occurs during stretching is relatively large, thereby being able to withstand a relatively large degree of stretching. In addition, it is supplemented that when the stacked structure of Embodiment 6 includes the conductive layer 130 (test sample No. #4 to #6) or includes the conductive layer 130 and the protective layer 140 (test sample No. #7 to #9), the measured resistance of the stretchable composite electrode fluctuates less during stretching, showing a relatively stable resistance.

Figure 12A:
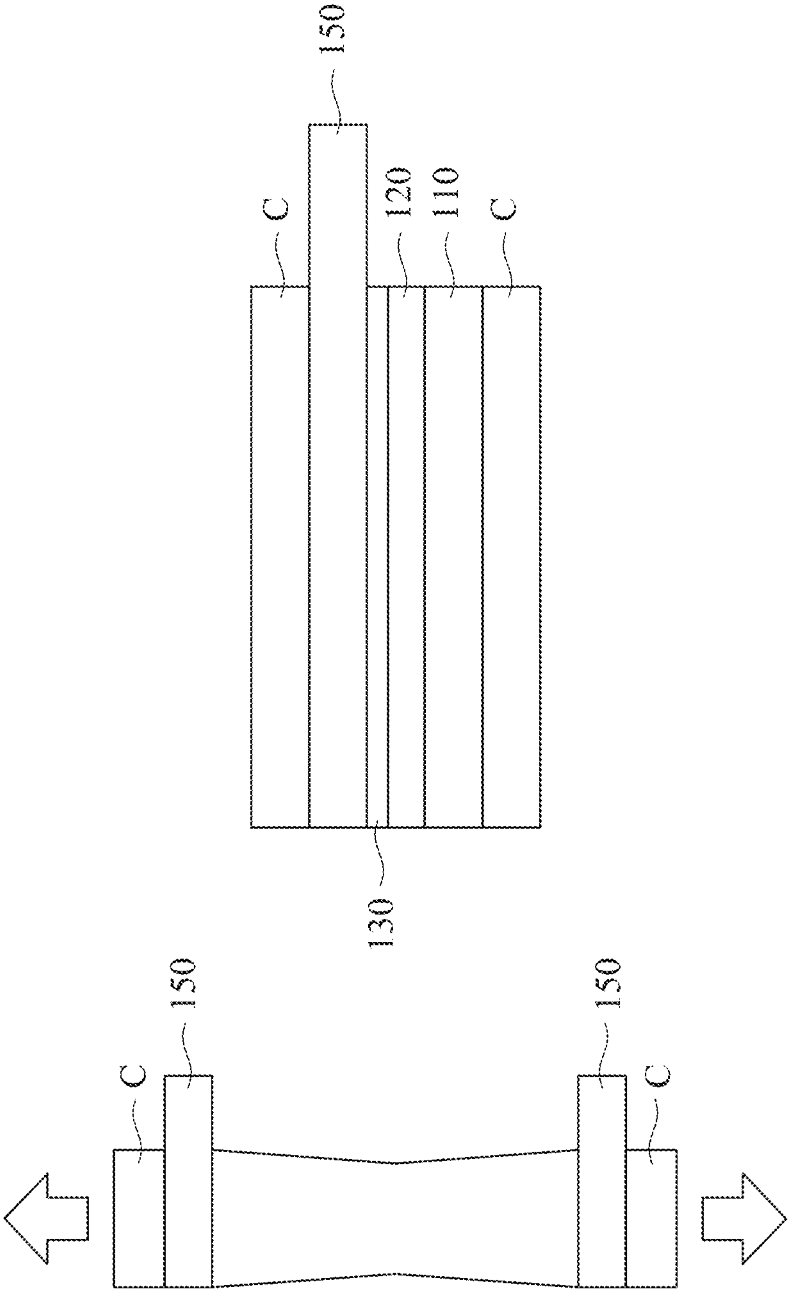
FIG. 12A shows a stretching direction and a schematic stacked view of the stretchable composite electrode of Embodiment 7.
Figure 12B:
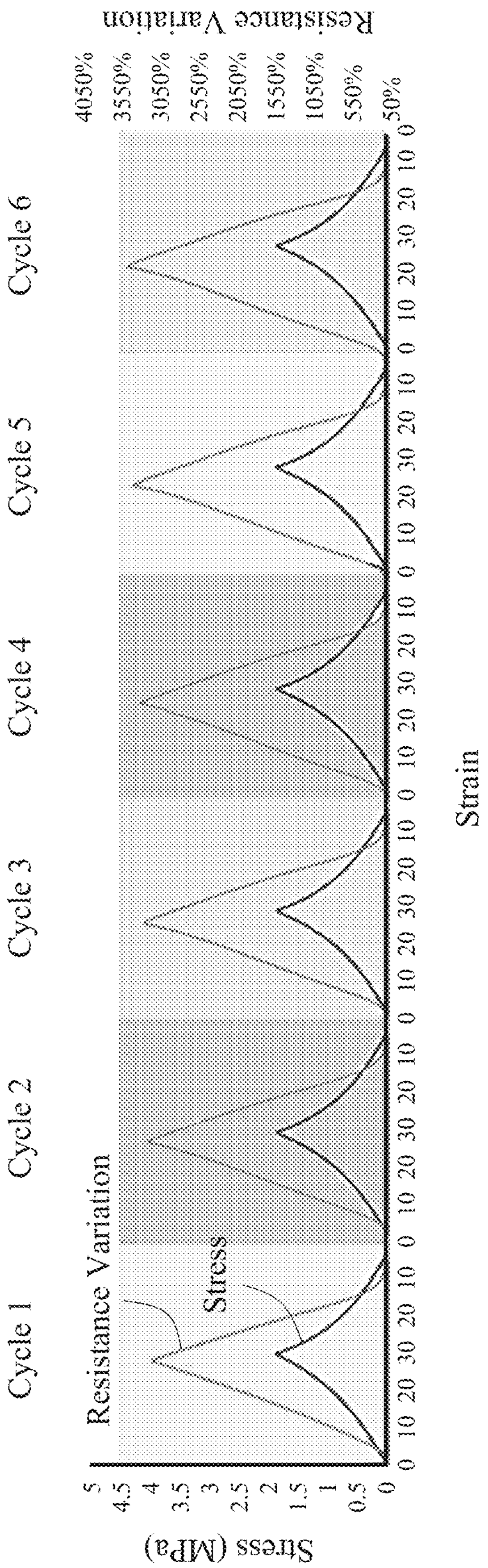
FIG. 12B shows a resistance-strain curve and a stress-strain curve of the stretchable composite electrode of Embodiment 7 when a stretching length variation is 47%.
Figure 12C:
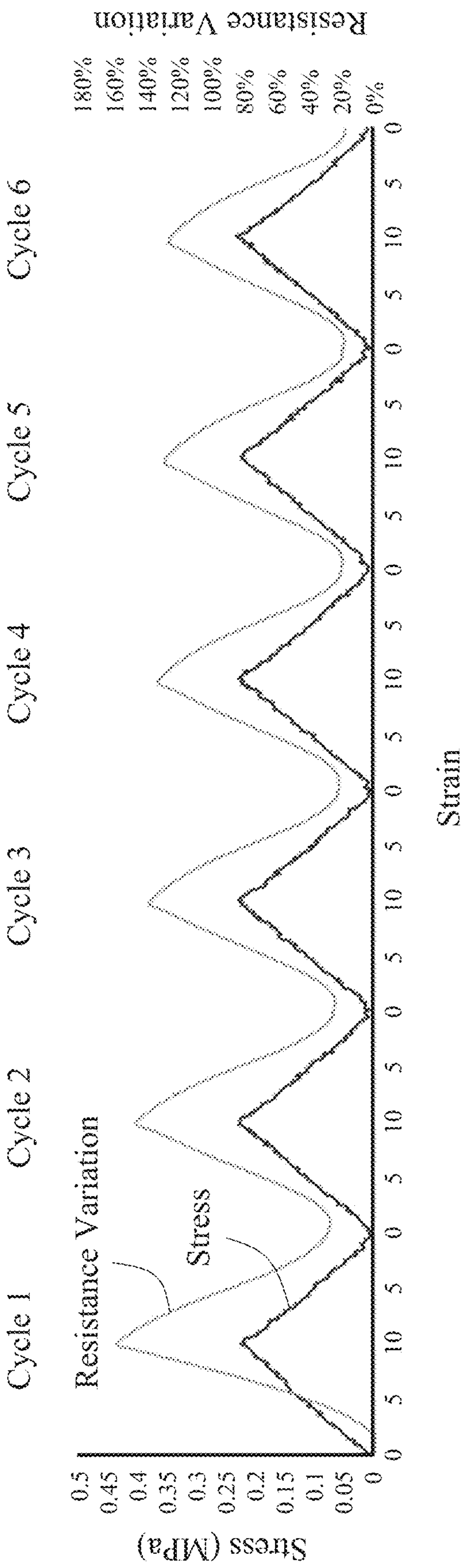
FIG. 12C shows a resistance-strain curve and a stress-strain curve of the stretchable composite electrode of Embodiment 7 when a stretching length variation is 18%.

Experimental: Stretching Resistance Recovery Test on Stretchable Composite Electrode In this experiment, the stretchable composite electrode of Embodiment 7 was stretched multiple times (using a same test sample to stretch multiple times), and the resistance recovery test was carried out during multiple (six times) stretching. The measurement method was to stretch the test sample by Instron tensile testing machine at a speed of 100 mm/min with an initial setting position of 50 mm, and at the initial stage where the test sample was in a tight state, the tensile applied was 0.08 N. The resistance recovery of the test sample before and after multiple stretches was measured. More specifically, reference is made to FIG. 12A to FIG. 12C, in which FIG. 12A shows a stretching direction and a schematic stacked view of the stretchable composite electrode of Embodiment 7, and FIG. 12B and FIG. 12C show the resistance recovery test result of the stretchable composite electrode of Embodiment 7. The manufacturing method of the stretchable composite electrode of Embodiment 7 was to adopt the manufacturing method disclosed in the present disclosure (steps S10 to S50). When performing the stretching resistance recovery test on Embodiment 7, the stacked structure included the PDMS film 110, the silver nanowire layer 120 covering an entire surface of the PDMS film 110, the conductive layer 130, and the conductive cloth 150 sequentially disposed from bottom to top, and the stack was clamped with clamps C to assist in the measurement, in which the stretching direction was the direction of the arrow as shown FIG. 12A. In addition, Embodiment 7 was an elongated test sample with a size of about 90 mm×20 mm.

Reference is made to FIG. 12B, which shows a resistance-strain curve and a stress-strain curve of the stretchable composite electrode of Embodiment 7 when a stretching length variation is 47%. It should be understood that the "stretching length variation" in the present disclosure is defined as "the ratio (expressed in percentage) of the length $L_f$ of the stretchable composite electrode after stretching to the length $L_i$ of the stretchable composite electrode before stretching (i.e. the original length $L_i$)"; the "resistance variation" is defined as "the ratio (expressed in percentage) of the value ΔR obtained after subtracting the initial resistance $R_i$ from the resistance $R_f$ of the stretchable composite electrode after stretching to the initial resistance $R_i$"; and the "stretching resistance recovery" is defined as the formula "100%−|(resistance variation after this stretching and recovery)−(resistance variation after the previous stretching and recovery)|". In addition, in order to present the test results more clearly, the strain in FIG. 12B is the standardized strain value ε, and the real strain can be obtained by the formula: ln(1+ε). As can be seen from FIG. 12B, the stretchable composite electrode of Embodiment 7 has undergone six continuous stretch and recovery cycles (cycle 1 to cycle 6), in which the stretching length variation of each stretch is 47%, the stretchable composite electrode of Embodiment 7 can return to an original length of the stretchable composite electrode (the length before stretching) after each stretch and recovery cycle, and the stretching resistance recovery of the stretchable composite electrode of Embodiment 7 is between 94% and 98%. Reference is made to FIG. 12C, which shows a resistance-strain curve and a stress-strain curve of the stretchable composite electrode of Embodiment 7 when a stretching length variation is 18%. As can be seen from FIG. 12C, the stretchable composite electrode of Embodiment 7 has undergone six continuous stretch and recovery cycles (cycle 1 to cycle 6), in which the stretching length variation of each stretch is 18%, the stretchable composite electrode of Embodiment 7 can return to an original length of the stretchable composite electrode (the length before stretching) after each stretch and recovery cycle, and the stretching resistance recovery of the stretchable composite electrode of Embodiment 7 is between 97% and 98%. The results of FIG. 12B and FIG. 12C show that the stretchable composite electrode of the present disclosure has the ability to withstand large stretching deformation (the stretching length variation is at least 47%) and has good stretching resistance recovery, thereby being reusable. The raw data of FIG. 12B and FIG. 12C are listed specifically in Table 6 below.

TABLE 6

| stretching length variation: 47%<br>initial resistance is set to be 0% | | | |
|---|---|---|---|
| stretching and recovery cycle | resistance of the trough (%) | stretching length variation (%) | stretching resistance recovery (%) |
| cycle 1 | 55.11% | 55.11% | — |
| cycle 2 | 60.81% | 60.81% | 94.30% |
| cycle 3 | 62.58% | 62.58% | 98.23% |
| cycle 4 | 68.63% | 68.63% | 93.95% |
| cycle 5 | 70.78% | 70.78% | 97.85% |
| cycle 6 | 74.43% | 74.43% | 96.35% |
| average value of stretching resistance recovery (%) | | | 96.14% |
| stretching and recovery times | resistance of the trough (%) | stretching length variation (%) | stretching resistance recovery (%) |
| cycle 1 | 129.06% | 29.06% | — |
| cycle 2 | 126.21% | 26.21% | 97.15% |
| cycle 3 | 123.50% | 23.50% | 97.29% |
| cycle 4 | 120.96% | 20.96% | 97.46% |
| cycle 5 | 119.86% | 19.86% | 98.90% |
| cycle 6 | 118.56% | 18.56% | 98.70% |
| average value of stretching resistance recovery (%) | | | 97.90% |

On the other hand, although not shown in the drawings, under the premise that the stretching resistance recovery of the stretchable composite electrode of Embodiment 7 falls within the aforementioned range, the number of stretching recovery times of the stretchable composite electrode of Embodiment 7 is between 1 and 20 times.

In order to highlight the characteristics and effects of the present disclosure, the present disclosure further tests the stretching resistance recovery of the electrode of Comparative Example 10 by the same method as that of the stretchable composite electrode of Embodiment 7, in which the manufacturing method of the electrode of Comparative Example 10 was to form the PET film first, then the PET film was subjected to a vacuum surface treatment with oxygen plasma, then the silver nanowire solution at least containing the silver nanowires 124 was sprayed on the PET film and cured to form the silver nanowire layer 120 on an entire surface of the PET film, and then the conductive layer (silver layer) 130 was disposed on the silver nanowire layer 120.

When performing the stretching resistance recovery test on Comparative Example 10, the stacked structure included the PET film, the silver nanowire layer 120, the conductive layer 130, and the conductive cloth 150 sequentially disposed from bottom to top, and the stack was clamped with clamps C to assist in the measurement, in which the stretching direction was the direction of the arrow as shown FIG. 12A. The results show that after Comparative Example 10 experiences six stretch and recovery cycles (in which each stretching variation is 47%), the average stretching resistance recovery is 73.76%; and after Comparative Example 10 experiences six stretch and recovery cycles (in which each stretching variation is 18%), the average stretching resistance recovery is 80.57%. It can be seen that, compared with directly spraying the silver nanowire solution on the PET film, the present disclosure uses the method of transferring to form the silver nanowire layer on the PDMS film, such that the silver nanowire layer can be partially embedded in the PDMS film, which is beneficial for the silver nanowire layer 120 to be firmly disposed on the film 110, such that the silver nanowire layer can withstand large stretching deformation and return to an original state of the silver nanowire layer (e.g., length, resistance) after multiple stretches, and thus suitable for application to wearable electronic devices.

According to the aforementioned embodiments of the present disclosure, since the silver nanowire layer is partially embedded in the film, the silver nanowire layer can be firmly combined with the film, and thus the stretchable composite electrode can be well applied to wearable electronic devices.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A stretchable composite electrode, comprising:

a film having a surface that is substantially flat, wherein the film is polydimethylsiloxane (PDMS) with a Young's modulus between 1.25 MPa and 3 MPa; and a silver nanowire layer partially embedded in the surface of the film, wherein when a stretching length variation of the stretchable composite electrode is 47%, a resistance recovery of the stretchable composite electrode is between 94% and 98%.

2. The stretchable composite electrode of claim 1, wherein when the stretching length variation of the stretchable composite electrode is 18%, the resistance recovery of the stretchable composite electrode is between 97% and 98%.

3. The stretchable composite electrode of claim 1, wherein a thickness of a portion of the silver nanowire layer that is embedded in the film is 0.027% to 0.048% of a thickness of the film.

4. The stretchable composite electrode of claim 1, wherein the silver nanowire layer comprises a plurality of silver nanowires, and at least a portion of the silver nanowires are embedded in the surface of the film.

5. The stretchable composite electrode of claim 1, wherein a thickness of the film is between 200 μm and 400 μm.

* * * * *